(12) United States Patent
Park et al.

(10) Patent No.: US 12,526,523 B2
(45) Date of Patent: Jan. 13, 2026

(54) CAMERA APPARATUS HAVING AUTOFOCUS AND OPTICAL IMAGE STABILIZATION FUNCTIONS

(71) Applicant: LG INNOTEK CO., LTD., Seoul (KR)

(72) Inventors: Sang Ok Park, Seoul (KR); Jung Cheol Kim, Seoul (KR); Hyun Soo Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 116 days.

(21) Appl. No.: 18/562,417

(22) PCT Filed: May 13, 2022

(86) PCT No.: PCT/KR2022/006883
§ 371 (c)(1),
(2) Date: Nov. 20, 2023

(87) PCT Pub. No.: WO2022/245056
PCT Pub. Date: Nov. 24, 2022

(65) Prior Publication Data
US 2024/0244325 A1 Jul. 18, 2024

(30) Foreign Application Priority Data
May 21, 2021 (KR) .................. 10-2021-0065808

(51) Int. Cl.
*H04N 5/335* (2011.01)
*H04N 23/51* (2023.01)
(Continued)

(52) U.S. Cl.
CPC ........... *H04N 23/687* (2023.01); *H04N 23/51* (2023.01); *H04N 23/54* (2023.01); *H04N 23/55* (2023.01); *H04N 23/57* (2023.01)

(58) Field of Classification Search
CPC .................................................. H04N 23/687
See application file for complete search history.

(56) References Cited

U.S. PATENT DOCUMENTS

| 2011/0286732 A1 | 11/2011 | Hosokawa et al. |
| 2012/0020654 A1 | 1/2012 | Yanagisawa et al. |

(Continued)

FOREIGN PATENT DOCUMENTS

| JP | 2017-167571 A | 9/2017 |
| KR | 10-1343197 B1 | 12/2013 |

(Continued)

OTHER PUBLICATIONS

Supplementary European Search Report dated Oct. 22, 2024 in European Application No. 22804911.0.
(Continued)

*Primary Examiner* — Gary C Vieaux
(74) *Attorney, Agent, or Firm* — Saliwanchik, Lloyd & Eisenschenk

(57) ABSTRACT

The present embodiment relates to a camera device comprising: a fixed part; a first moving part comprising a lens and disposed inside the fixed part; a second moving part comprising an image sensor and disposed inside the fixed part; a first magnet and a second magnet disposed in the fixed part; a first coil disposed in the first moving part and disposed at a position corresponding to the first magnet; and a second coil disposed in the second moving part and disposed at a position corresponding to the second magnet, wherein the first coil moves the first moving part in an optical axis direction, wherein the first magnet is overlapped with the second magnet in the optical axis direction, and wherein the length of the first magnet in the optical axis direction is longer than the length of the second magnet.

20 Claims, 22 Drawing Sheets

(51) Int. Cl.
*H04N 23/54* (2023.01)
*H04N 23/55* (2023.01)
*H04N 23/57* (2023.01)
*H04N 23/68* (2023.01)

(56) References Cited

U.S. PATENT DOCUMENTS

| | | | |
|---|---|---|---|
| 2020/0241238 A1 | 7/2020 | Park | |
| 2022/0337753 A1* | 10/2022 | Oh | H04N 23/51 |
| 2023/0023813 A1* | 1/2023 | Oh | H04N 23/54 |
| 2024/0244306 A1* | 7/2024 | Park | G03B 30/00 |
| 2024/0244323 A1* | 7/2024 | Oh | G03B 13/36 |
| 2024/0244324 A1* | 7/2024 | Oh | H04N 23/54 |
| 2025/0024149 A1* | 1/2025 | Kim | H04N 23/68 |

FOREIGN PATENT DOCUMENTS

| | | | |
|---|---|---|---|
| KR | 10-2020-0083953 A | | 7/2020 |
| KR | 10-2021-0026659 A | | 3/2021 |
| KR | 20210026659 A | * | 3/2021 |

OTHER PUBLICATIONS

International Search Report dated Aug. 18, 2022 in International Application No. PCT/KR2022/006883.

* cited by examiner (a)

(b)

FIG. 23(a)
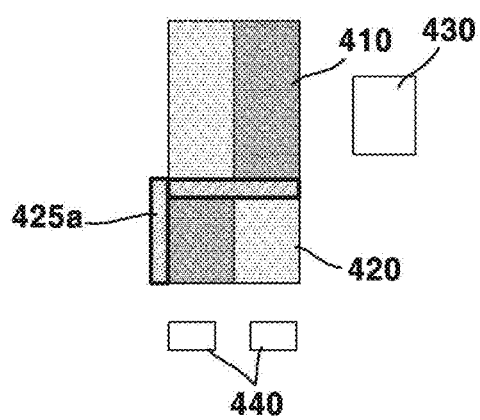
(a)
FIG. 23(b)
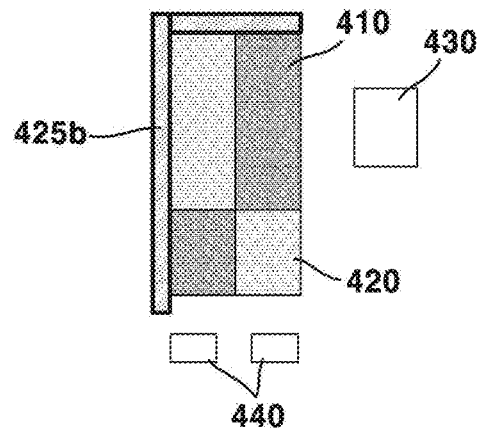
(b)
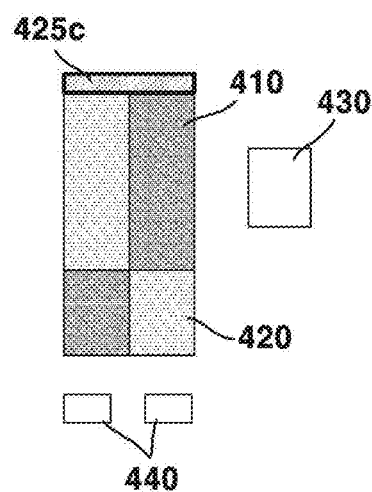
(c)
FIG. 23(c)
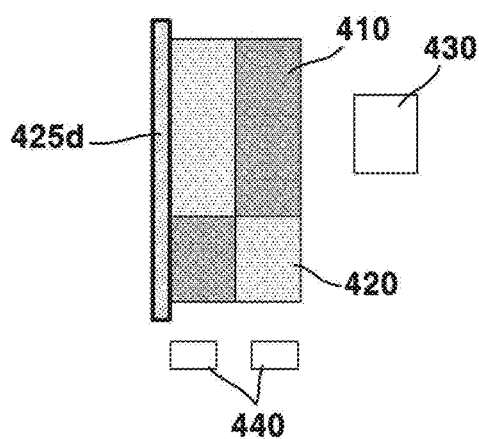
(d)
FIG. 23(d)

CAMERA APPARATUS HAVING AUTOFOCUS AND OPTICAL IMAGE STABILIZATION FUNCTIONS

CROSS-REFERENCE TO RELATED APPLICATIONS

This application is the U.S. national stage application of International Patent Application No. PCT/KR2022/006883, filed May 13, 2022, which claims the benefit under 35 U.S.C. § 119 of Korean Application No. 10-2021-0065808, filed May 21, 2021, the disclosures of each of which are incorporated herein by reference in their entirety.

TECHNICAL FIELD

The present embodiment relates to a camera device.

BACKGROUND ART

A camera device is a device that photographs a subject as a picture or video, and is being installed in optical devices such as smartphones, drones, and vehicles.

In order to improve image quality, a camera device is required to have a handshake correction (optical image stabilization, OIS) function that corrects image shake caused by user movement.

In the camera device, the handshake correction function is performed by moving the lens in a direction perpendicular to the optical axis. However, as the diameter of the lens increases in accordance with the recent trend toward high pixel density, the weight of the lens increases, and accordingly, there is a problem in that it is difficult to secure electromagnetic force for moving the lens in a limited space.

DETAILED DESCRIPTION OF THE INVENTION

Technical Subject

The present embodiment is intended to provide a camera device that performs handshake correction by moving the image sensor.

The present embodiment is intended to provide a camera device that drives the image sensor in three axes: x-axis shift, y-axis shift, and z-axis rolling.

Technical Solution

A camera device according to the present embodiment comprises: a fixed part; a first moving part comprising a bobbin and a lens being coupled to the bobbin and being disposed inside the fixed part; a second moving part comprising an image sensor and being disposed inside the fixed part; a first magnet and a second magnet being disposed in the fixed part; a first coil being disposed in the first moving part and being disposed at a position corresponding to the first magnet; and a second coil being disposed in the second moving part and being disposed at a position corresponding to the second magnet, wherein the first coil moves the first moving part in an optical axis direction, wherein the first magnet is overlapped with the second magnet in the optical axis direction, wherein the first magnet comprises a first unit magnet and a second unit magnet being disposed opposite to each other with respect to the optical axis, wherein a third unit magnet and a fourth unit magnet being disposed opposite to each other with respect to the optical axis, wherein the first unit magnet comprises a part being protruded to the outside of the bobbin in x-axis direction perpendicular to the optical axis direction, and wherein the part of the first unit magnet may be overlapped with the third unit magnet in the optical axis direction and in y-axis direction perpendicular to the x-axis direction.

The first magnet may comprise a part being protruded in the x-axis direction with respect to an imaginary plane comprising an outer side surface of the bobbin.

A first region of the first magnet which is not protruded may be overlapped with the bobbin in the x-axis direction.

A region of the second magnet below the first region of the first magnet may not be overlapped with the bobbin in the x-axis direction.

A camera device according to the present embodiment comprises: a fixed part; a first moving part comprising a bobbin and moving in an optical axis direction; a second moving part comprising an image sensor and moving in a direction perpendicular to the optical axis direction; a first magnet and a second magnet being disposed in the fixed part; a first coil being disposed in the first moving part and being disposed at a position corresponding to the first magnet; and a second coil being disposed in the second moving part and being disposed at a position corresponding to the second magnet, wherein the bobbin comprises first to fourth side surfaces, wherein the first magnet comprises a first unit magnet being disposed to correspond to the first side surface of the bobbin, a second unit magnet being disposed to correspond to the second side surface of the bobbin, and a third unit magnet being disposed to correspond to the third side surface of the bobbin, wherein the first side surface and the second side surface of the bobbin are located opposite to each other, and wherein a portion of the first unit magnet may be overlapped with the third unit magnet in y-axis direction perpendicular to the optical axis direction.

The first unit magnet is disposed between a first corner and a second corner of the fixed part and may be disposed closer to the first corner than the second corner.

The camera device according to the present embodiment comprises: an image sensor moving in a direction perpendicular to an optical axis direction; a housing being disposed in the image sensor; a bobbin being disposed inside the housing; a lens being coupled to the bobbin; a first magnet and a second magnet being disposed in the housing, wherein the housing comprises first to fourth side surfaces, wherein the second magnet comprises a first unit magnet being disposed to correspond to the first side surface of the housing, a second unit magnet being disposed to correspond to the second side surface of the housing, and a third unit magnet being disposed to correspond to the third side surface of the housing, wherein the first side surface and the second side surface of the housing are located opposite to each other, and wherein a part of the first unit magnet of the second magnet may be overlapped with the third unit magnet of the second magnet in y-axis direction perpendicular to the optical axis direction.

The camera device comprises: a first coil being disposed at a position corresponding to the first magnet; and a second coil being disposed at a position corresponding to the second magnet, wherein the first unit magnet of the second magnet comprises a part being protruded to the outside of the second coil in the optical axis direction and x-axis direction perpendicular to the y-axis direction.

The part of the first unit magnet of the second magnet may not be overlapped with the second coil in the optical axis direction.

The camera device according to the present embodiment comprises: a fixed part; a first moving part comprising a lens and being disposed inside the fixed part; a second moving part comprising an image sensor and being disposed inside the fixed part; a first magnet and a second magnet being disposed in the fixed part; a first coil being disposed in the first moving part and being disposed at a position corresponding to the first magnet; and a second coil being disposed in the second moving part and being disposed at a position corresponding to the second magnet, wherein the first coil moves the first moving part in an optical axis direction, wherein the first magnet is overlapped with the second magnet in the optical axis direction, wherein the first magnet comprises a first unit magnet and a second unit magnet being disposed opposite to each other with respect to the optical axis, a third unit magnet and a fourth unit magnet being disposed opposite to each other with respect to the optical axis, wherein the first unit magnet comprises a first surface facing the first coil, and wherein the first unit magnet may be overlapped with the third unit magnet in a direction perpendicular to the first surface.

The first moving part comprises a bobbin in which the first coil is disposed, and when viewed in a direction in which the first surface faces, the first magnet may comprise a part being protruded to the outer side of the bobbin in x-axis direction perpendicular to the optical axis direction.

When viewed in the direction in which the first surface faces, the length of the second coil in the horizontal direction may be greater than the length of the second magnet in the horizontal direction.

The part of the first magnet may be overlapped with the second coil in the optical axis direction.

The second magnet may comprise a part not being overlapped with the second coil in the optical axis direction.

The part of the first magnet may not be overlapped with the part of the second magnet in the optical axis direction.

The first magnet comprises: a first pole formed on a first surface facing the first coil; and a second pole formed on a second surface opposite to the first surface, wherein the second magnet may comprise a second pole being overlapped with the first pole of the first magnet in the optical axis direction, and a first pole being overlapped with the second pole of the first magnet in the optical axis direction.

When viewed from above, the second coil is disposed on an outer side of the bobbin, and when viewed in a direction in which the first surface faces, the second coil may comprise a part being disposed below the bobbin and being protruded further than the edge of the bobbin.

The third unit magnet may be disposed to be long in length in the direction perpendicular to the first surface.

The first unit magnet may not be overlapped with the second unit magnet in a direction in which the first surface faces.

The fixed part comprises a first side portion between the first corner portion and the second corner portion, the first unit magnet is disposed to be long in length in the first side portion in an arrangement direction of the first side portion, and the first unit magnet may be disposed closer to the first corner portion than to the second corner portion.

The fixed part comprises a third side portion between the first corner portion and the fourth corner portion, the third unit magnet is disposed to be long in length in the third side portion in an arrangement direction of the third side portion, and the third unit magnet may be disposed closer to the fourth corner portion than to the first corner portion.

The fixed part comprises: a first side portion and a second side portion being disposed opposite to each other; a third side portion and a fourth side portion being disposed opposite to each other; a first corner portion being disposed between the first side portion and the third side portion; and a second corner portion being disposed between the first side portion and the fourth side portion, wherein the first unit magnet is disposed in the first side portion of the fixed part and may be disposed closer to the first corner portion than the second corner portion.

The fixed part comprises: a third corner part disposed between the second side portion and the fourth side portion; and a fourth corner portion disposed between the second side portion and the third side portion, wherein the second unit magnet is disposed in the second side portion of the fixed part and may be disposed closer to the third corner portion than the fourth corner portion.

In the optical axis direction, the length of the first magnet may be greater than the length of the second magnet.

The first magnet may be in contact with the second magnet.

The first magnet may be bonded to the second magnet by an adhesive.

A yoke being disposed between the first magnet and the second magnet may be comprised.

The fixed part comprises: a first substrate being disposed below the image sensor; a base being disposed in the first substrate; and a housing being disposed in the base, wherein the first magnet and the second magnet may be disposed in the housing.

The first magnet may be a 2-pole magnet, and the second magnet may be a 4-pole magnet.

The first magnet may be a two-pole magnet, and the second magnet may be a two-pole magnet, and a neutral region having no polarity may be formed between the first magnet and the second magnet.

The first magnet is disposed to be long in length in a first direction perpendicular to the optical axis direction, and, in the first direction, the length of the first magnet may be longer than the length of the second magnet.

The length of the first magnet may be shorter than the length of the second magnet in the optical axis direction and a second direction perpendicular to the first direction.

In the first direction, the length of the second magnet may be longer than the length of the second coil.

The first coil is overlapped with the first magnet in a direction perpendicular to the optical axis direction, and the second coil may be overlapped with the second magnet in the optical axis direction.

When a driving current in a first direction is applied to the first coil, the first moving part moves downward in the optical axis direction to a first position; when a driving current in a second direction opposite to the first direction is applied to the first coil, the first moving part moves upward in the optical axis direction to a second position; the first coil may be overlapped with the first magnet in a direction perpendicular to the optical axis direction in both cases when the first moving part is located in the first position and when located in the second position.

A camera device according to the present embodiment comprises: a fixed part; a first moving part comprising a bobbin and a lens being coupled to the bobbin and being disposed inside the fixed part; a second moving part comprising an image sensor and being disposed inside the fixed part; a first magnet and a second magnet being disposed in the fixed part; a first coil being disposed in the first moving part and being disposed at a position corresponding to the first magnet; and a second coil being disposed in the second moving part and being disposed at a position corresponding to the second magnet, wherein the first coil moves the first moving part in an optical axis direction, wherein the first magnet being overlapped with the second magnet in the optical axis direction, wherein the fixed part comprises a first side portion between the first corner portion and the second corner portion, wherein the first magnet may comprise a first unit magnet being disposed to be long in length in the first side portion in an arrangement direction of the first side portion, and wherein the first unit magnet may be disposed closer to the first corner portion than the second corner portion.

The first magnet may be directly coupled to the second magnet or coupled with a yoke therebetween, and the first magnet may be larger than the second magnet.

The first magnet may be bonded to the second magnet by an adhesive.

The first magnet may be a 2-pole magnet, and the second magnet may be a 4-pole magnet.

Each of the first magnet and the second magnet comprises a first unit magnet and a second unit magnet being disposed opposite to each other with respect to an optical axis, and a third unit magnet and a fourth unit magnet being disposed opposite to each other with respect to the optical axis, wherein the first unit magnet comprises a first surface facing the first coil, and wherein the first unit magnet may be overlapped with the third unit magnet in a direction in which the first surface faces.

An optical device according to the present embodiment comprises a main body; a camera device being disposed in the main body; and a display being disposed in the main body and outputting a video or an image photographed by the camera device.

Advantageous Effects

Through the present embodiment, the image sensor can be moved to perform the handshake correction function.

Through the magnet arrangement structure according to the present embodiment, electromagnetic force for driving AF and OIS can be enhanced.

Accordingly, since the size of the magnet may be reduced, the size and weight of the camera device may be reduced.

BRIEF DESCRIPTION OF DRAWINGS

FIG. 21$b$ is a cross-sectional view of a magnet and a coil of a camera device according to a second modified embodiment.

FIGS. 23($a$)-23($d$) are cross-sectional view-views of a magnet and a coil of a camera device according to fourth to seventh modified embodiments.

FIG. 28 is a diagram for explaining driving in which an image sensor of a camera device is shifted along the x-axis according to the present embodiment. FIG. 29 is a diagram for explaining driving in which an image sensor of a camera device according to the present embodiment is shifted along the y-axis. FIG. 30 is a view for explaining driving in which an image sensor of a camera device according to the present embodiment is rolled around the z-axis.

BEST MODE

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (comprising technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may comprise the plural form unless specifically stated in the phrase, and when described as "at least one (or more than one) of A and B and C", it may comprise one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also comprise cases of being 'connected', 'coupled', or 'interconnected' due that another component between that other components.

In addition, when described as being formed or arranged in "on (above)" or "below (under)" of each component, "on (above)" or "below (under)" means that it comprises not only the case where the two components are directly in contact with, but also the case where one or more other components are formed or arranged between the two components. In addition, when expressed as "on (above)" or "below (under)", the meaning of not only an upward direction but also a downward direction based on one component may be comprised.

Hereinafter, a camera device according to the present embodiment will be described with reference to the drawings.

Figure 1:
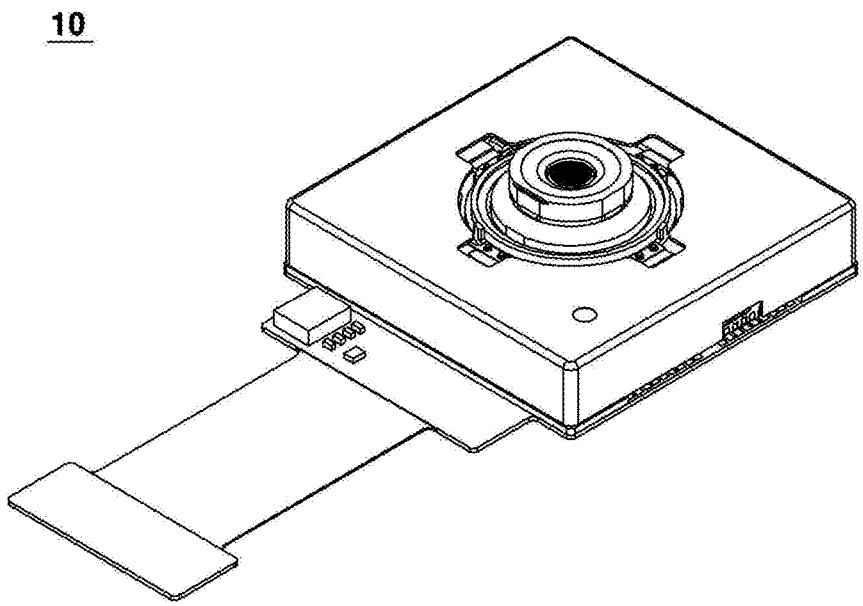
FIG. 1 is a perspective view of a camera device according to the present embodiment.
Figure 2:
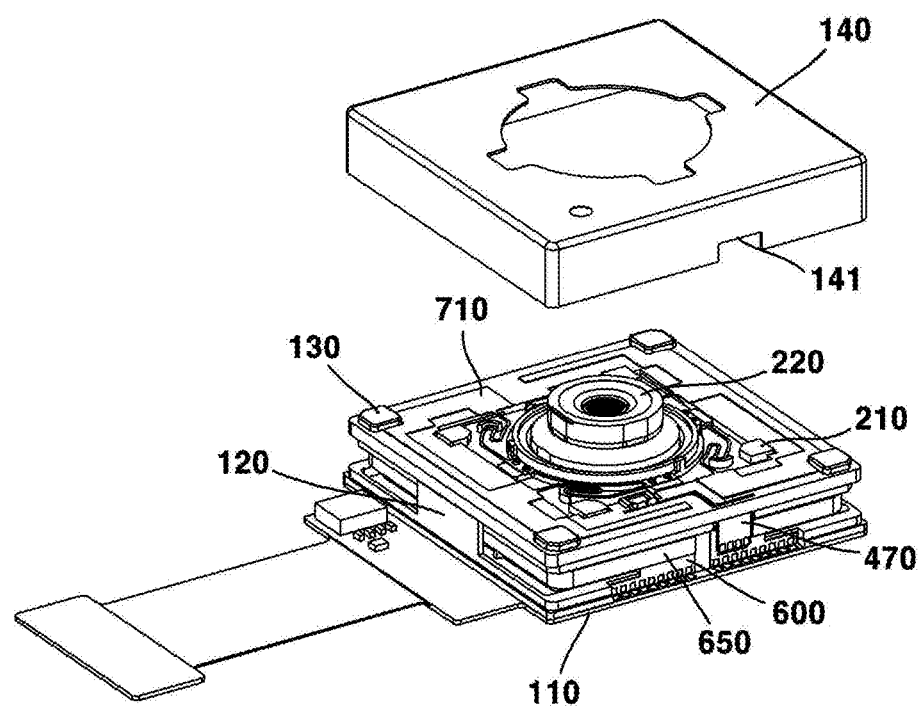
FIG. 2 is a perspective view of a state in which the cover member is omitted from the camera device according to the present embodiment.
Figure 3:
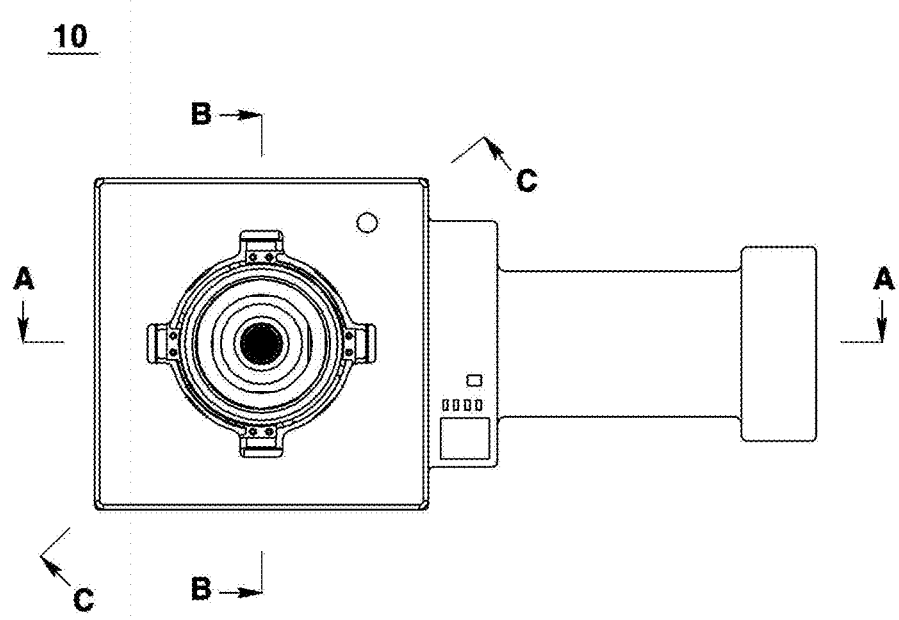
FIG. 3 is a plan view of a camera device according to the present embodiment.
Figure 4:
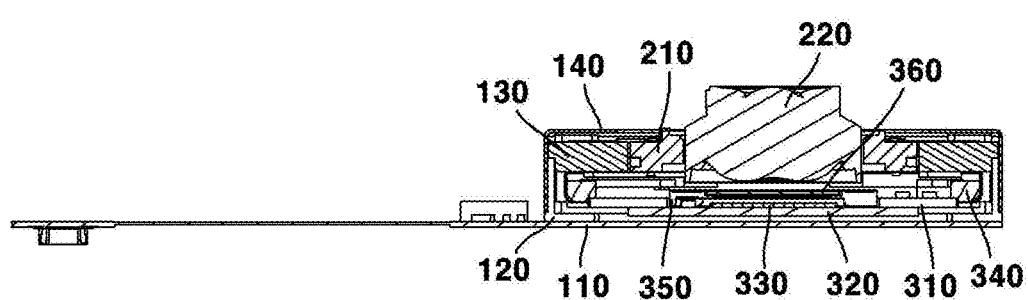
FIG. 4 is a cross-sectional view taken along line A-A of FIG. 3.
Figure 5:
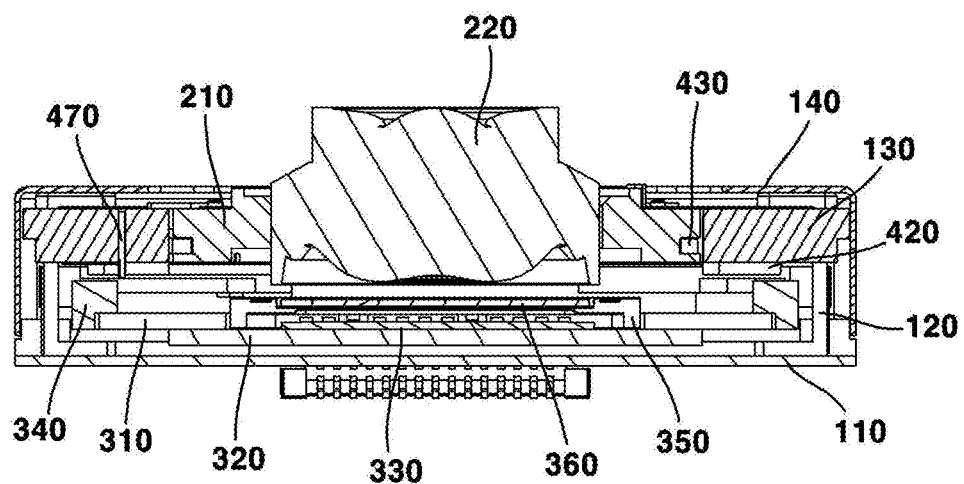
FIG. 5 is a cross-sectional view taken along line B-B of FIG. 3.
Figure 6:
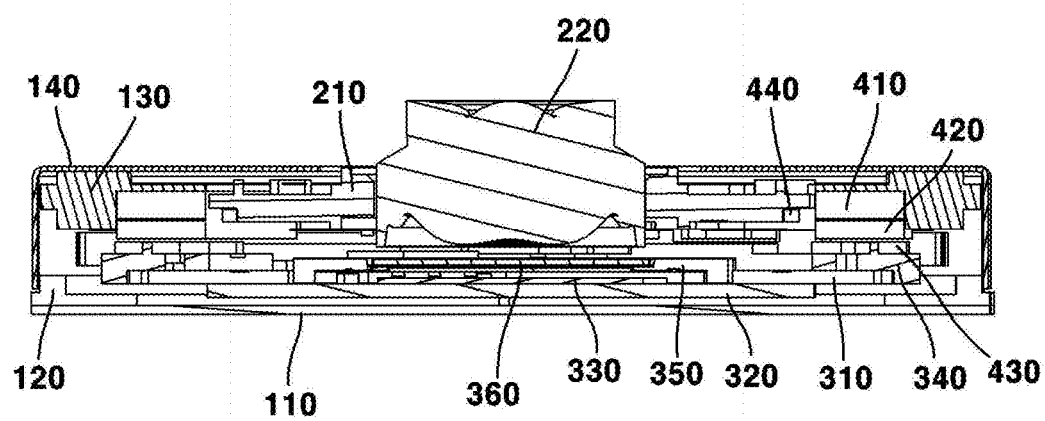
FIG. 6 is a cross-sectional view taken along line C-C of FIG. 3.
Figure 7:
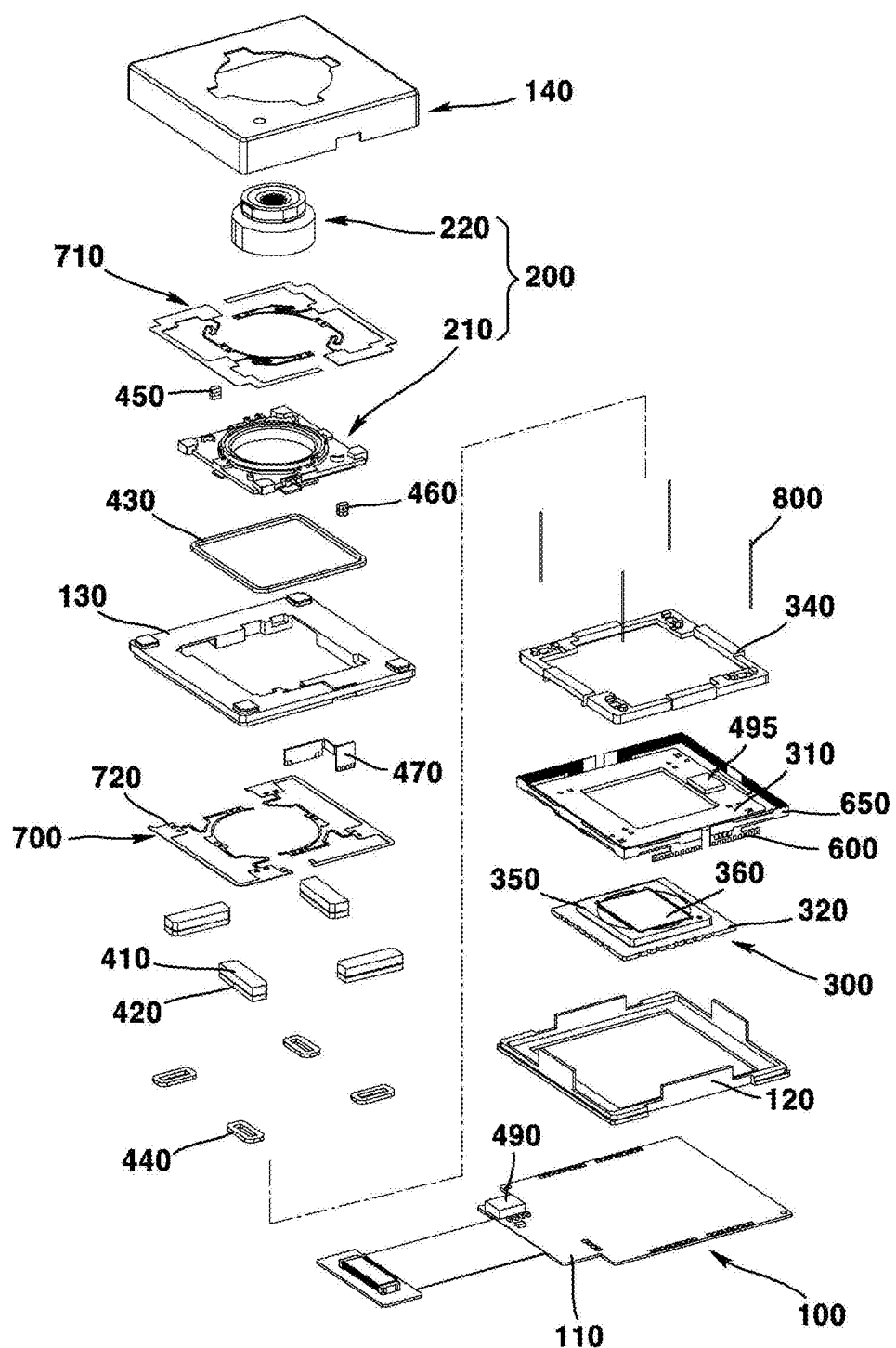
FIG. 7 is an exploded perspective view of a camera device according to the present embodiment.
Figure 8:
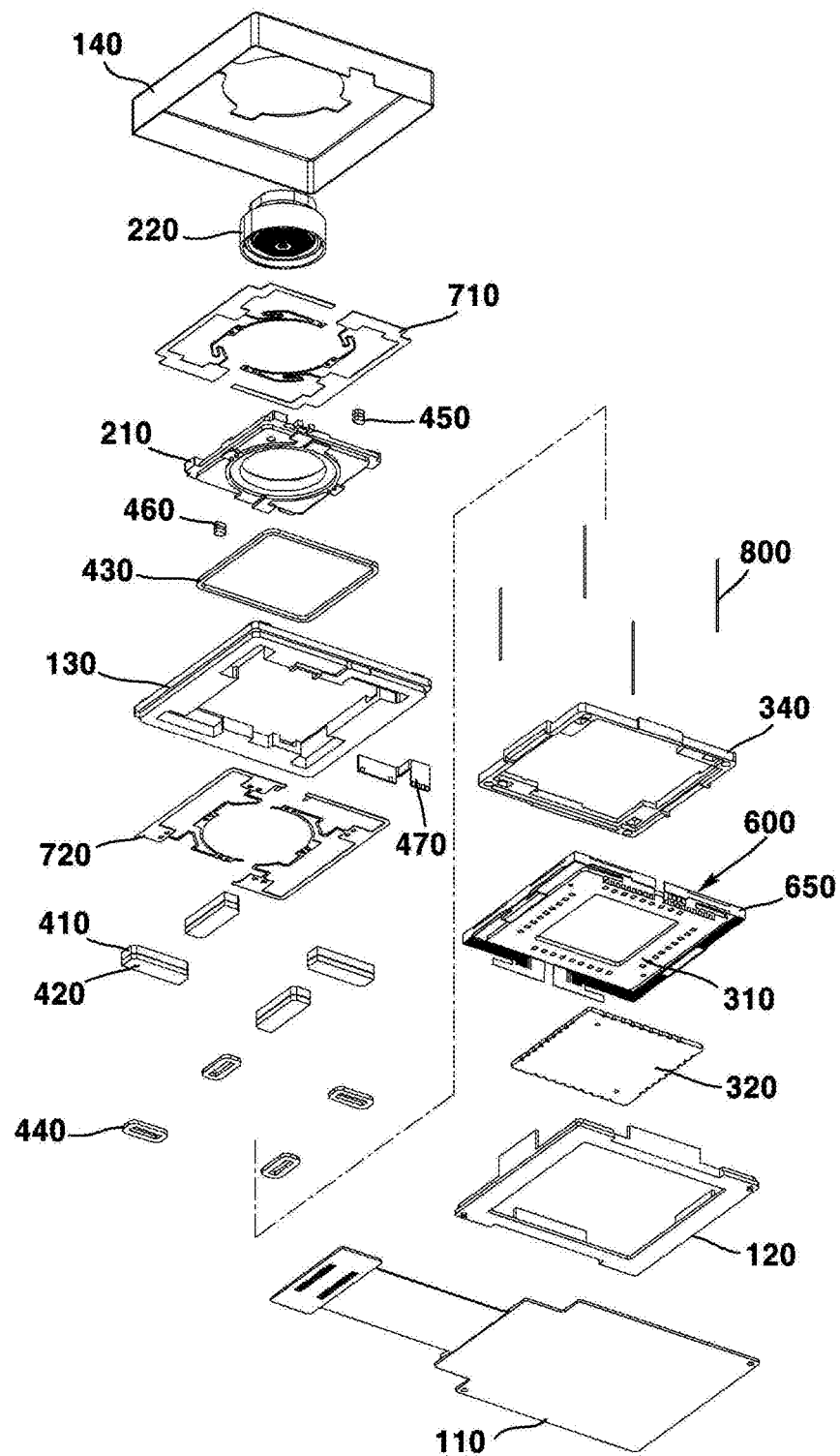
FIG. 8 is an exploded perspective view of a camera device according to the present embodiment viewed from a different direction from FIG. 7.
Figure 9:
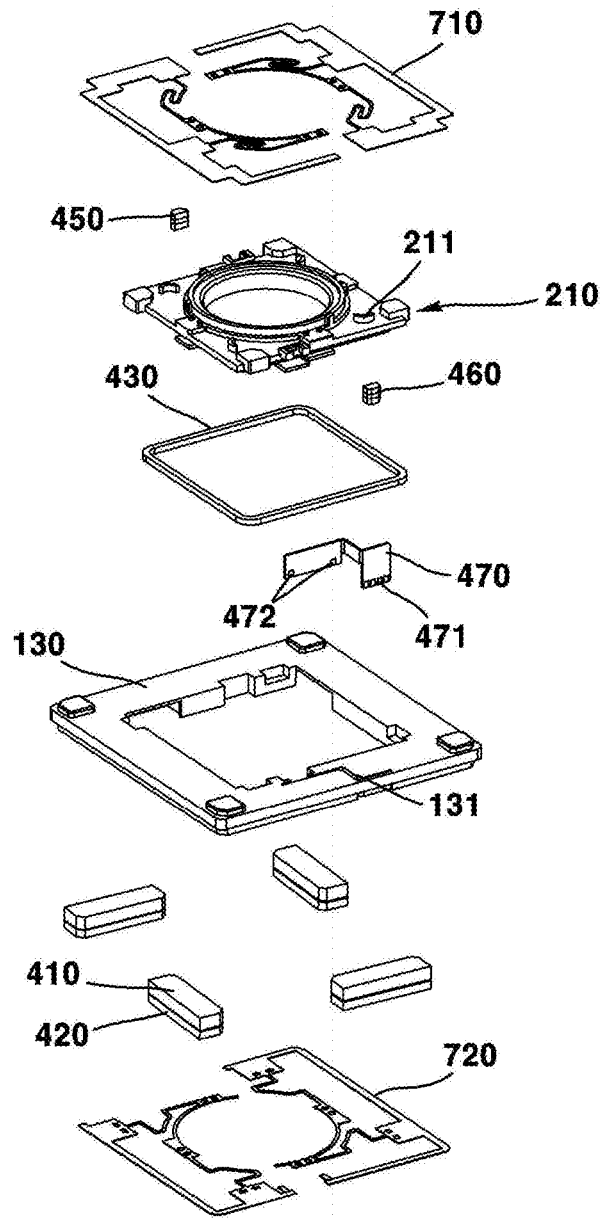
FIG. 9 is an exploded perspective view of a first moving part and related configuration of a camera device according to the present embodiment.
Figure 10:
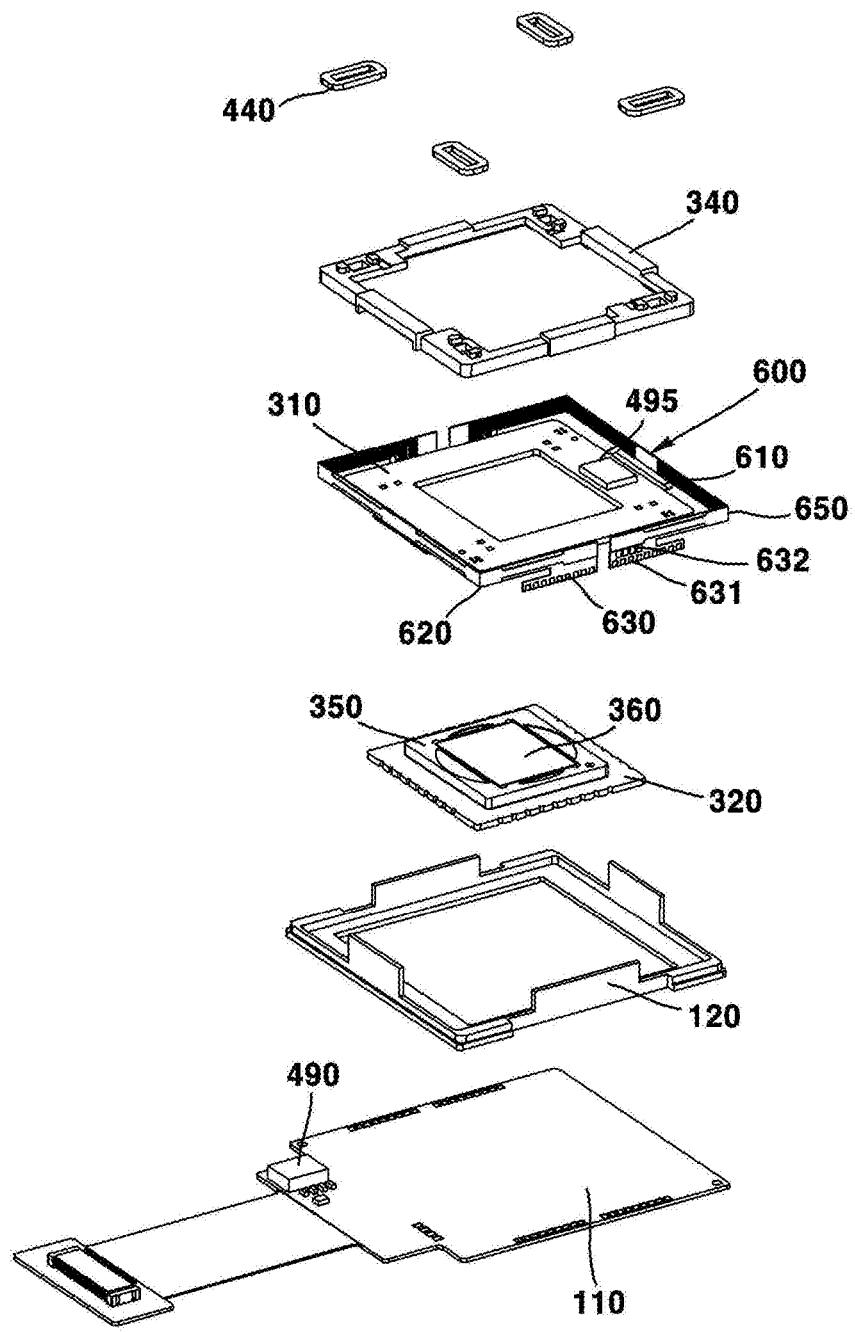
FIG. 10 is an exploded perspective view of a second moving part and related configuration of a camera device according to the present embodiment.
Figure 11:
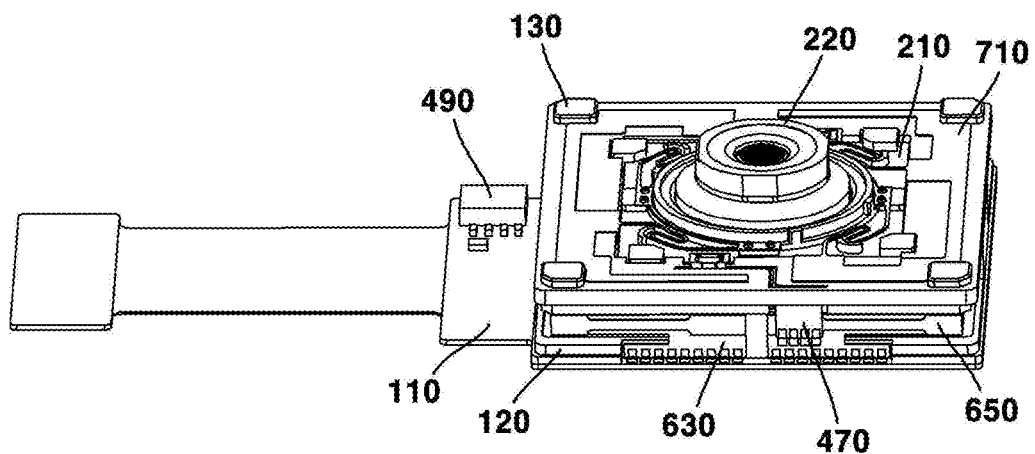
FIG. 11 is a perspective view of a state in which a cover member is omitted from a camera device according to the present embodiment.
Figure 12:
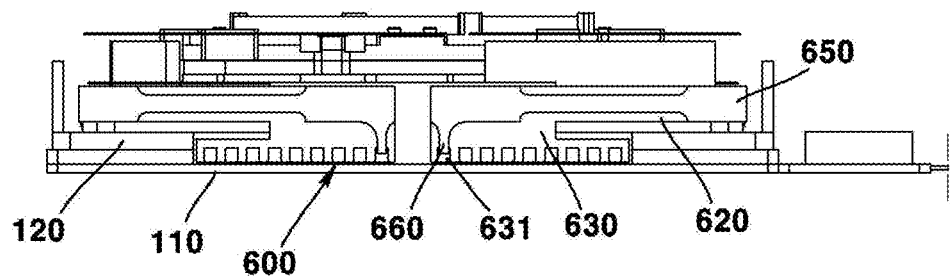
FIG. 12 is a side view of a state in which a cover member is omitted from a camera device according to the present embodiment.
Figure 13:
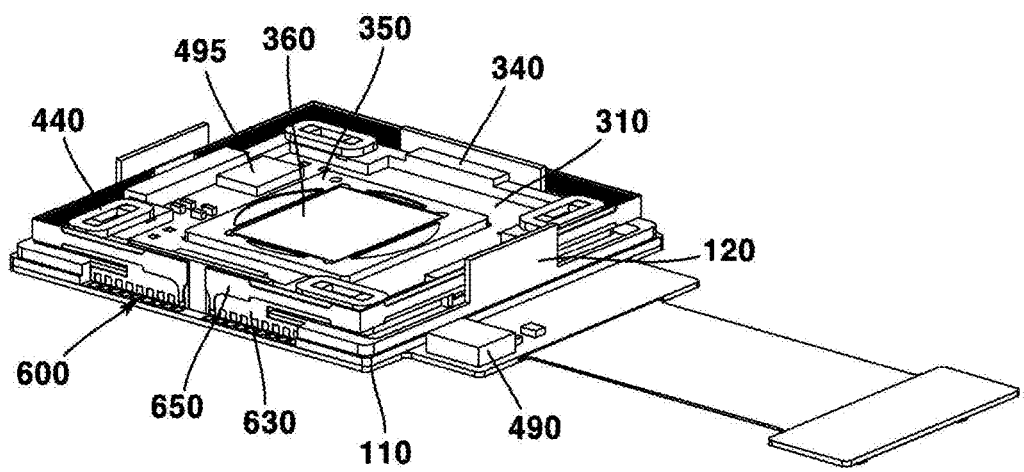
FIG. 13 is a perspective view illustrating a second moving part, a fixing part, and a connection substrate of a camera device according to the present embodiment.
Figure 14:
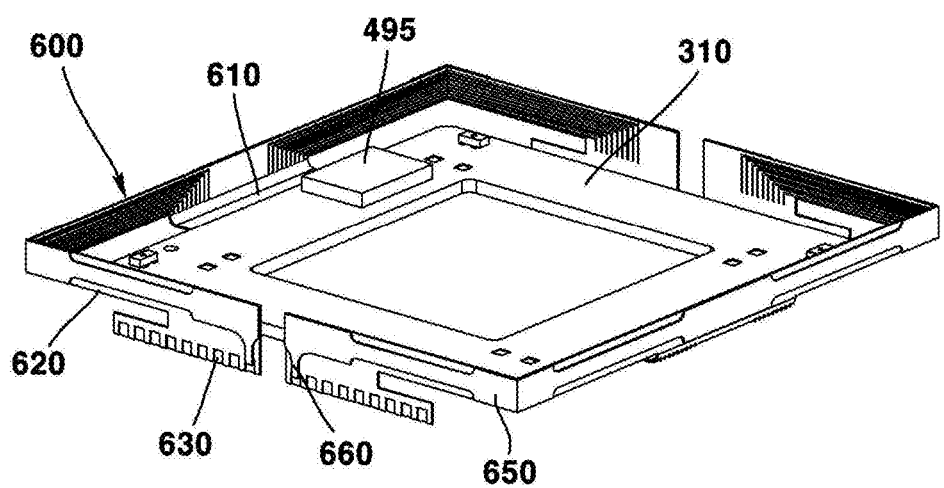
FIG. 14 is a perspective view illustrating a part of a second moving part and a connection substrate of a camera device according to the present embodiment.
Figure 15A:
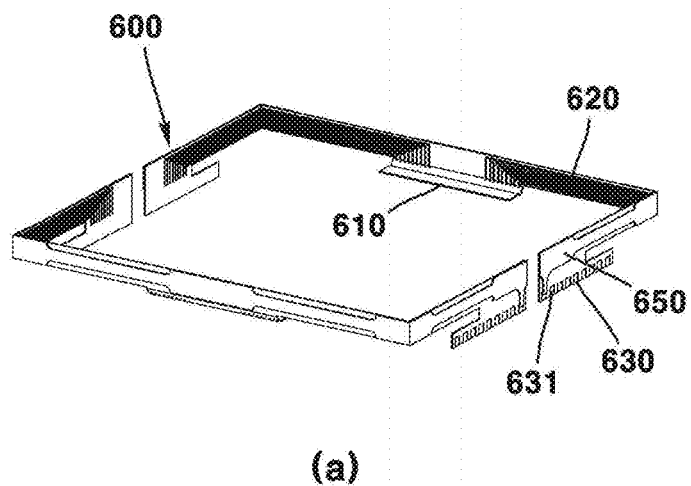
FIG. 15($a$) is a perspective view of a connection substrate and the metal plate of a camera device according to the present embodiment, and FIG. 15($b$) is a cross-sectional view of a connection substrate and a metal plate of a camera device according to the present embodiment.
Figure 15B:
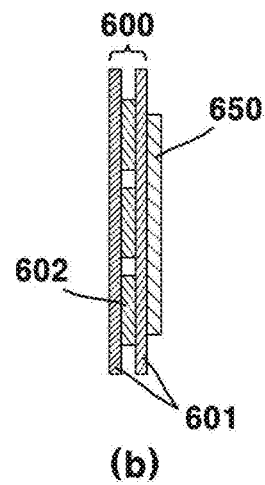
Figure 16:
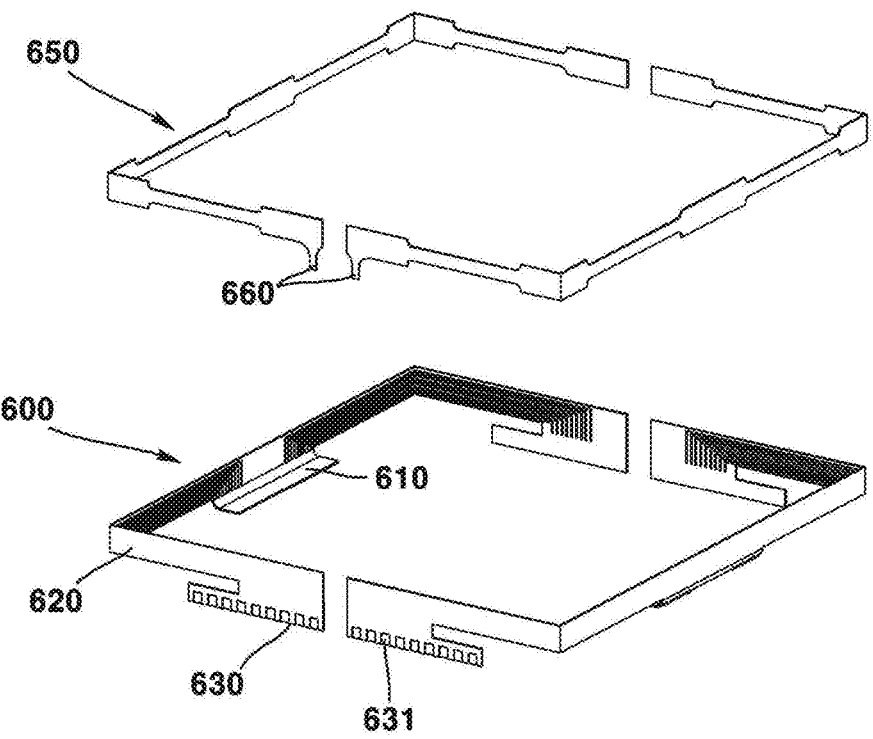
FIG. 16 is an exploded perspective view illustrating a connection substrate and a metal plate of a camera device according to the present embodiment separated.
Figure 17:
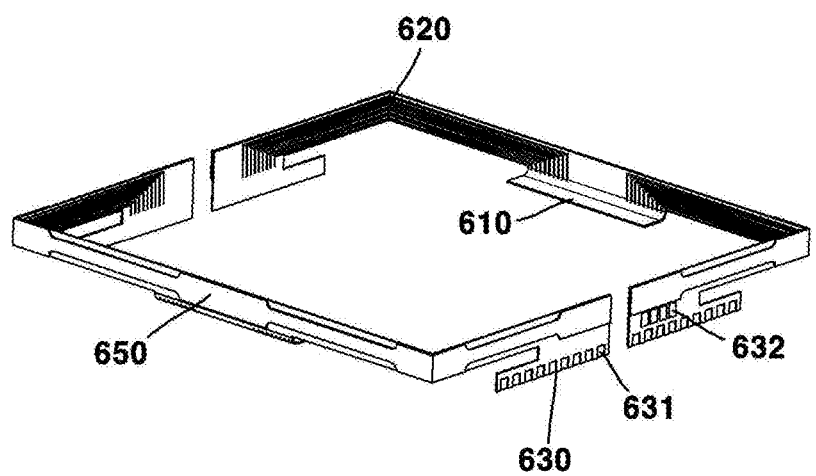
FIG. 17 is a perspective view of a connection substrate and a metal plate of a camera device according to the present embodiment.
Figure 18:
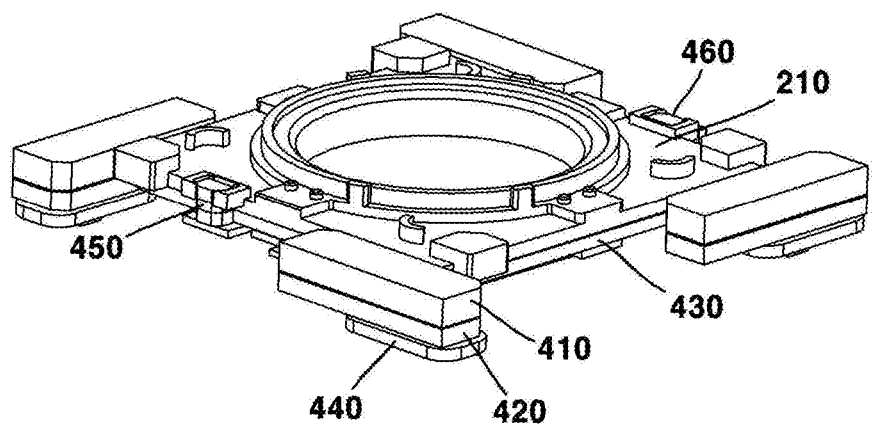
FIG. 18 is a perspective view illustrating a partial configuration of a bobbin and a driving unit of a camera device according to the present embodiment.
Figure 19:
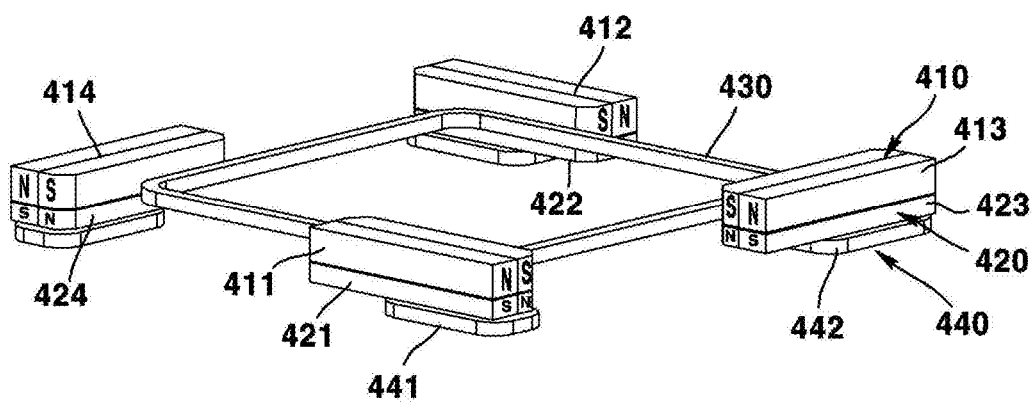
FIG. 19 is a perspective view of a magnet and a coil of a camera device according to the present embodiment.
Figure 20:
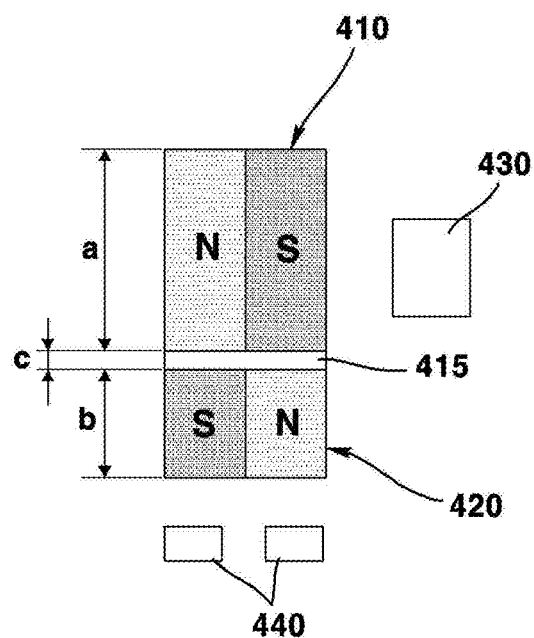
FIG. 20 is a cross-sectional view of a magnet and a coil of a camera device according to the present embodiment.
Figure 21A:
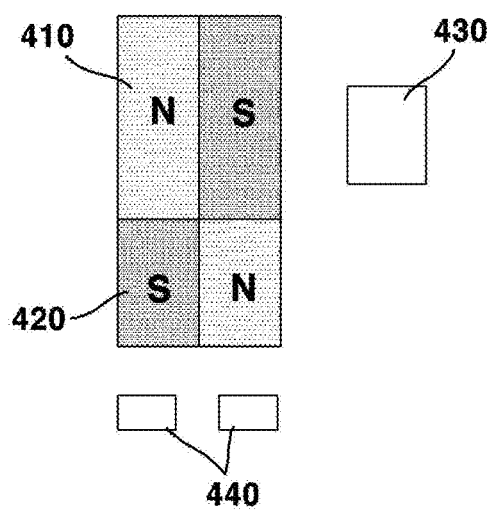
FIG. 21$a$ is a cross-sectional view of a magnet and a coil of a camera device according to a first modified embodiment.
Figure 21B:
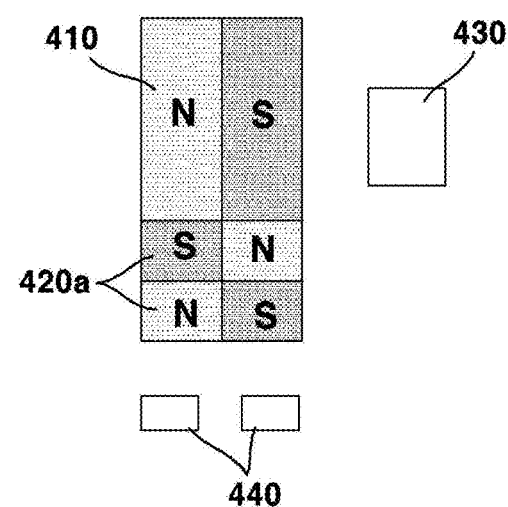
Figure 22:
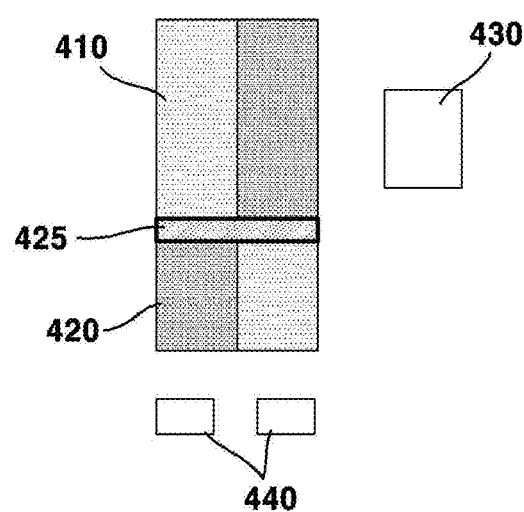
FIG. 22 is a cross-sectional view of a magnet and a coil of a camera device according to a third modified embodiment.
Figure 24:
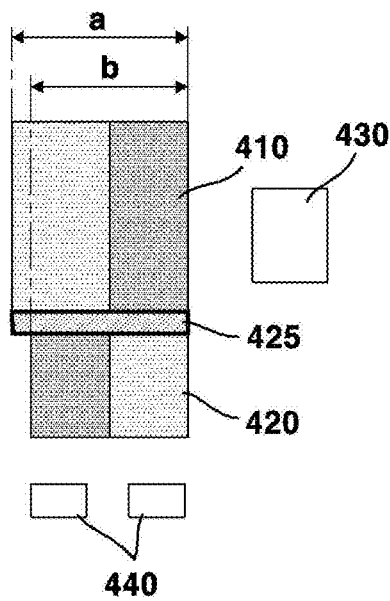
FIG. 24 is a cross-sectional view of a magnet and a coil of a camera device according to an eighth modified embodiment.
Figure 25:
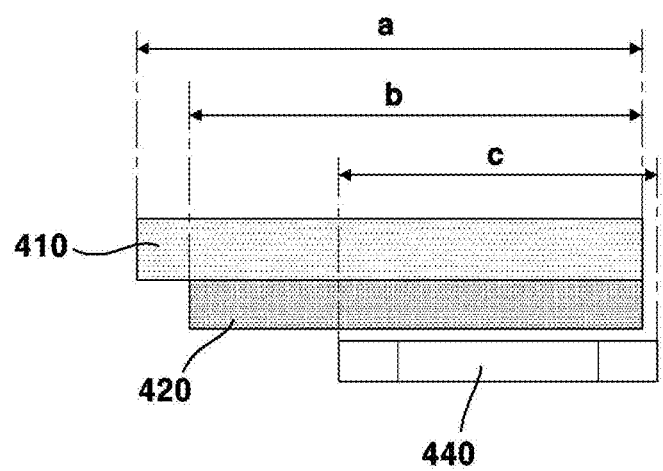
FIG. 25 is a cross-sectional view of a magnet and a coil of a camera device according to a ninth modified embodiment.
Figure 26:
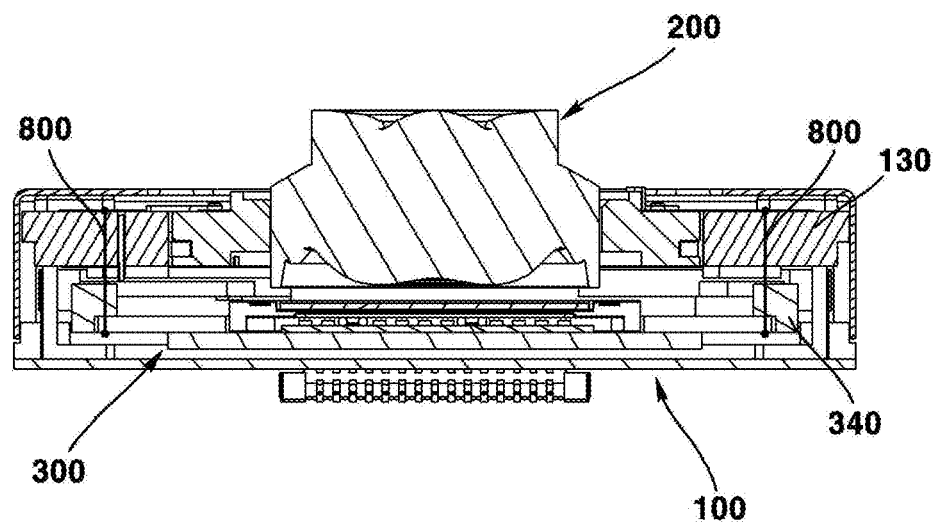
FIG. 26 is a cross-sectional view of a camera device according to the present embodiment. The wire of the camera device according to the present embodiment may be omitted in some drawings.

FIG. 1 is a perspective view of a camera device according to the present embodiment; FIG. 2 is a perspective view of a state in which the cover member is omitted from the camera device according to the present embodiment; FIG. 3 is a plan view of a camera device according to the present embodiment; FIG. 4 is a cross-sectional view taken along line A-A of FIG. 3; FIG. 5 is a cross-sectional view taken along line B-B of FIG. 3; FIG. 6 is a cross-sectional view taken along line C-C of FIG. 3; FIG. 7 is an exploded perspective view of a camera device according to the present embodiment; FIG. 8 is an exploded perspective view of a camera device according to the present embodiment viewed from a different direction from FIG. 7; FIG. 9 is an exploded perspective view of a first moving part and related configuration of a camera device according to the present embodiment; FIG. 10 is an exploded perspective view of a second moving part and related configuration of a camera device according to the present embodiment; FIG. 11 is a perspective view of a state in which a cover member is omitted from a camera device according to the present embodiment; FIG. 12 is a side view of a state in which a cover member is omitted from a camera device according to the present embodiment; FIG. 13 is a perspective view illustrating a second moving part, a fixing part, and a connection substrate of a camera device according to the present embodiment; FIG. 14 is a perspective view illustrating a part of a second moving part and a connection substrate of a camera device according to the present embodiment; FIG. 15(a) is a perspective view of a connection substrate and the metal plate of a camera device according to the present embodiment; FIG. 15(b) is a cross-sectional view of a connection substrate and a metal plate of a camera device according to the present embodiment; FIG. 16 is an exploded perspective view illustrating a connection substrate and a metal plate of a camera device according to the present embodiment separated; FIG. 17 is a perspective view of a connection substrate and a metal plate of a camera device according to the present embodiment; FIG. 18 is a perspective view illustrating a partial configuration of a bobbin and a driving unit of a camera device according to the present embodiment; FIG. 19 is a perspective view of a magnet and a coil of a camera device according to the present embodiment; FIG. 20 is a cross-sectional view of a magnet and a coil of a camera device according to the present embodiment; FIG. 21a is a cross-sectional view of a magnet and a coil of a camera device according to a first modified embodiment; FIG. 21b is a cross-sectional view of a magnet and a coil of a camera device according to a second modified embodiment; FIG. 22 is a cross-sectional view of a magnet and a coil of a camera device according to a third modified embodiment; FIGS. 23(a)-23(d) are cross-sectional views of a magnet and a coil of a camera device according to fourth to seventh modified embodiments; FIG. 24 is a cross-sectional view of a magnet and a coil of a camera device according to an eighth modified embodiment; FIG. 25 is a cross-sectional view of a magnet and a coil of a camera device according to a ninth modified embodiment; and FIG. 26 is a cross-sectional view of a camera device according to the present embodiment. The wire of the camera device according to the present embodiment may be omitted in some drawings.

The camera device 10 may photograph any one or more of an image and a video. The camera device 10 may be a camera. The camera device 10 may be a camera module. The camera device 10 may be a camera assembly. The camera device 10 may be a camera unit. The camera device 10 may comprise a lens driving device. The camera device 10 may comprise a sensor driving device. The camera device 10 may comprise a voice coil motor (VCM). The camera device 10 may comprise an auto focus assembly. The camera device 10 may comprise a handshake correction assembly. The camera device 10 may comprise an autofocus device. The camera device 10 may comprise a handshake correction device. The camera device 10 may comprise an actuator. The camera device 10 may comprise a lens driving actuator. The camera device 10 may comprise a sensor driven actuator. The camera device 10 may comprise an auto focus actuator. The camera device 10 may comprise a handshake correction actuator.

The camera device 10 may comprise a fixed part 100. The fixed part 100 may be a relatively fixed portion when the moving parts 200 and 300 move. The fixed part 100 may be a relatively fixed portion when one or more of a first moving part 200 and the second moving part 300 moves. The fixed part 100 may accommodate the first moving part 200 and the second moving part 300. The fixed part 100 may be disposed at an outer side of the first moving part 200 and the second moving part 300.

Although the first substrate 110 has been described as one configuration of the fixed part 100 throughout the specification, the first substrate 110 may be understood as a separate configuration from the fixed part 100. The fixed part 100 may be disposed in the first substrate 110. The fixed part 100 may be disposed on the first substrate 110. The fixed part 100 may be disposed above the first substrate 110.

The camera device 10 may comprise a first substrate 110. The fixed part 100 may comprise a first substrate 110. The first substrate 110 may be a main substrate. The first substrate 110 may be a substrate. The first substrate 110 may be a printed circuit board (PCB). The first substrate 110 may be connected to a power source of the optical device 1. The first substrate 110 may comprise a connector connected to a power source of the optical device 1. The first substrate 110 may be disposed below the image sensor 330.

The camera device 10 may comprise a base 120. The fixed part 100 may comprise a base 120. The base 120 may be disposed in the first substrate 110. The base 120 may be disposed on the first substrate 110. The base 120 may be disposed above the first substrate 110. The base 120 may be fixed to the first substrate 110. The base 120 may be coupled to the first substrate 110. The base 120 may be bonded to the first substrate 110 by an adhesive. The base 120 may be disposed between the first substrate 110 and a housing 130.

The camera device 10 may comprise a housing 130. The fixed part 100 may comprise a housing 130. The housing 130 may be disposed in the base 120. The housing 130 may be disposed on the base 120. The housing 130 may be disposed above the base 120. The housing 130 may be fixed to the base 120. The housing 130 may be coupled to the base 120. The housing 130 may be bonded to the base 120 by an adhesive. The housing 130 may be disposed on the first substrate 110. The housing 130 may be disposed above the first substrate 110. The housing 130 may be formed of a member separate from the base 120. The housing 130 may be integrally formed.

The camera device 10 may comprise a cover member 140. The fixed part 100 may comprise a cover member 140. The cover member 140 may be coupled to the base 120. The cover member 140 may be coupled to the housing 130. The cover member 140 may be coupled to the first substrate 110. The cover member 140 may be fixed to the base 120. The cover member 140 may be fixed to the housing 130. The cover member 140 may be fixed to the first substrate 110. The cover member 140 may cover at least a portion of the base 120. The cover member 140 may cover at least a portion of the housing 130.

The cover member 140 may be a 'cover can' or a 'shield can'. The cover member 140 may be formed of a metal material. The cover member 140 may block electromagnetic interference (EMI). The cover member 140 may be electrically connected to the first substrate 110. The cover member 140 may be grounded to the first substrate 110.

The cover member 140 may comprise an upper plate. The cover member 140 may comprise a hole formed in the upper plate. The hole may be formed at a position corresponding to the lens 220. The cover member 140 may comprise a side plate. The side plate may comprise a plurality of side plates. The side plate may comprise four side plates. The side plate may comprise first to fourth side plates. The side plate may comprise first and second side plates being disposed opposite to each other, and third and fourth side plates being disposed opposite to each other. The cover member 140 may comprise a plurality of corners between the plurality of side plates.

Although the cover member 140 has been described as one configuration of the fixed part 100 throughout the specification, the cover member 140 may be understood as a configuration separate from the fixed part 100. The cover member 140 may be coupled to the fixed part 100. The cover member 140 may cover the first moving part 200.

The camera device 10 may comprise a first moving part 200. The first moving part 200 may move with respect to the fixed part 100. The first moving part 200 may move in an optical axis direction with respect to the fixed part 100. The first moving part 200 may be disposed inside the fixed part 100. The first moving part 200 may be movably disposed inside the fixed part 100. The first moving part 200 may be arranged to be movable in an optical axis direction in the fixed part 100. An auto focus (AF) function may be performed by moving the first moving part 200 in an optical axis direction with respect to the fixed part 100. The first moving part 200 may be disposed on the second moving part 300.

The camera device 10 may comprise a bobbin 210. The first moving part 200 may comprise a bobbin 210. The bobbin 210 may be disposed on the first substrate 110. The bobbin 210 may be disposed above the first substrate 110. The bobbin 210 may be disposed to be spaced apart from the first substrate 110. The bobbin 210 may be disposed inside the housing 130. The bobbin 210 may be disposed inside the housing 130. At least a portion of the bobbin 210 may be accommodated in the housing 130. The bobbin 210 may be movably disposed in the housing 130. The bobbin 210 may be movably disposed on the housing 130 in an optical axis direction. The bobbin 210 may be coupled to the lens 220. The bobbin 210 may comprise a hollow or a hole. The lens 220 may be disposed in a hollow or hole of the bobbin 210. The outer circumferential surface of the lens 220 may be coupled to the inner circumferential surface of the bobbin 210.

The camera device 10 may comprise a lens 220. The first moving part 200 may comprise a lens 220. The lens 220 may be coupled to the bobbin 210. The lens 220 may be fixed to the bobbin 210. The lens 220 may move integrally with the bobbin 210. The lens 220 may be screw-coupled to the bobbin 210. The lens 220 may be bonded to the bobbin 210 by an adhesive. The lens 220 may be disposed at a position corresponding to an image sensor 330. The optical axis of the lens 220 may coincide with the optical axis of the image sensor 330. The optical axis may be the z-axis. The lens 220 may comprise a plurality of lenses. The lens 220 may comprise a 5 or 6 lenses.

The camera device 10 may comprise a lens module. The lens module may be coupled to the bobbin 210. The lens module may comprise a barrel and one or more lenses 220 being disposed inside the barrel.

The camera device 10 may comprise a second moving part 300. The second moving part 300 may move with respect to the fixed part 100. The second moving part 300 may move in a direction perpendicular to an optical axis direction with respect to the fixed part 100. The second moving part 300 may be disposed inside the fixed part 100. The second moving part 300 may be movably disposed inside the fixed part 100. The second moving part 300 may be movably disposed inside the fixed part 100 in a direction perpendicular to an optical axis direction. A handshake correction (OIS) function may be performed by moving the second moving part 300 in a direction perpendicular to an optical axis direction with respect to the fixed part 100. The second moving part 300 may be disposed between the first moving part 200 and the first substrate 110.

The camera device 10 may comprise a second substrate 310. The second moving part 300 may comprise a second substrate 310. The second substrate 310 may be a substrate. The second substrate 310 may be a printed circuit board (PCB). The second substrate 310 may be disposed between the first moving part 200 and the first substrate 110. The second substrate 310 may be disposed between the bobbin 210 and the first substrate 110. The second substrate 310 may be disposed between the lens 220 and the first substrate 110. The second substrate 310 may be spaced apart from the fixed part 100. The second substrate 310 may be spaced apart from the fixed part 100 in a direction perpendicular to an optical axis direction and the optical axis direction. The second substrate 310 may move in a direction perpendicular to an optical axis direction. The second substrate 310 may be electrically connected to the image sensor 330. The second substrate 310 may move integrally with the image sensor 330. The second substrate 310 may comprise a hole. The image sensor 330 may be disposed in the hole of the second substrate 310.

The second substrate 310 may comprise a terminal 311. The terminal 311 may be disposed on a lower surface of the second substrate 310. The terminal 311 may be coupled to the terminal 321 of the sensor substrate 320. The second substrate 310 may be formed separately from the sensor substrate 320. The second substrate 310 may be formed separately from the sensor substrate 320 to be coupled thereto. The terminal 321 of the sensor substrate 320 may be soldered to the terminal 311 of the second substrate 310.

The camera device 10 may comprise a sensor substrate 320. The second moving part 300 may comprise a sensor substrate 320. The sensor substrate 320 may be a substrate. The sensor substrate 320 may be a printed circuit board (PCB). The sensor substrate 320 may be coupled to the image sensor 330. The sensor substrate 320 may be coupled to the second substrate 310.

The sensor substrate 320 may comprise a terminal 321. The terminal 321 of the sensor substrate 320 may be coupled to the terminal 311 of the second substrate 310. The sensor substrate 320 may be coupled to a lower surface of the second substrate 310. The sensor substrate 320 may be disposed below the second substrate 310. The sensor substrate 320 while being coupled with the image sensor 330 may be coupled below the second substrate 310.

The camera device 10 may comprise an image sensor 330. The second moving part 300 may comprise an image sensor 330. The image sensor 330 may be disposed in the sensor substrate 320. The image sensor 330 may be disposed between the sensor substrate 320 and a sensor base 350. The image sensor 330 may be electrically connected to the second substrate 310. The image sensor 330 may move integrally with the second substrate 310.

Light passing through the lens 220 and the filter 360 may be incident to the image sensor 330 to form an image. The image sensor 330 may be electrically connected to the sensor substrate 320, the second substrate 310, and the first substrate 110. The image sensor 330 may comprise an effective image region. The image sensor 330 may convert light being irradiated to the effective image region into an electrical signal. The image sensor 330 may comprise any one or more among a charge coupled device (CCD), a metal oxide semi-conductor (MOS), a CPD, and a CID.

The camera device 10 may comprise a holder 340. The second moving part 300 may comprise a holder 340. The holder 340 may be formed of an insulating material. The holder 340 may be disposed in the second substrate 310. The holder 340 may be disposed on the second substrate 310. The holder 340 may be disposed above the second substrate 310. The holder 340 may be fixed to the second substrate 310. The holder 340 may be coupled to the second substrate 310. The holder 340 may comprise a hollow or a hole in which the image sensor 330 is disposed. A second coil 440 may be disposed in the holder 340. The holder 340 may comprise a protrusion on which the second coil 440 is wound. The holder 340 may comprise a hole in which the Hall sensor 445 is disposed.

The camera device 10 may comprise a sensor base 350. The second moving part 300 may comprise a sensor base 350. The sensor base 350 may be disposed in the sensor substrate 320. The sensor base 350 may comprise a hole formed at a position corresponding to the image sensor 330. The sensor base 350 may comprise a groove in which the filter 360 is disposed.

The camera device 10 may comprise a filter 360. The second moving part 300 may comprise a filter 360. The filter 360 may be disposed between the lens 220 and the image sensor 330. The filter 360 may be disposed in the sensor base 350. The filter 360 may block light of a specific frequency band from being incident on the image sensor 330 among the light passing through the lens 220. The filter 360 may comprise an infrared cut filter. The filter 360 may block infrared rays from being incident on the image sensor 330.

The camera device 10 may comprise a driving unit. The driving unit may move the moving parts 200 and 300 with respect to the fixed part 100. The driving unit may perform an auto focus (AF) function. The driving unit may perform a handshake correction (OIS) function. The driving unit may move the lens 220. The driving unit may move the image sensor 330. The driving unit may comprise a magnet and a coil. The driving unit may comprise a shape memory alloy (SMA).

The camera device 10 may comprise a first driving unit. The first driving unit may be an AF driving unit. The first driving unit may move the first moving part 200 in an optical axis direction. The first driving unit may move the bobbin 210 in an optical axis direction. The lens 220 may be moved in an optical axis direction. The first driving unit may perform an auto focus (AF) function. The first driving unit may move the first moving part 200 in an upward direction of the optical axis direction. The first driving unit may move the first moving part 200 downward direction of the optical axis direction.

The camera device 10 may comprise a second driving unit. The second driving unit may be an OIS driving unit. The second driving unit may move the second moving part 300 in a direction perpendicular to the optical axis direction. The second driving unit may move the second substrate 310 in a direction perpendicular to the optical axis direction. The second driving unit may move the sensor substrate 320 in a direction perpendicular to the optical axis direction. The second driving unit may move the image sensor 330 in a direction perpendicular to the optical axis direction. The second driving unit may move the holder 340 in a direction perpendicular to the optical axis direction. The second driving unit may move the sensor base 350 in a direction perpendicular to the optical axis direction. The second driving unit may move the filter 360 in a direction perpendicular to the optical axis direction. The second driving unit may perform a handshake correction (OIS) function.

The second driving unit may move the second moving part 300 in a first direction perpendicular to the optical axis direction. The second driving unit may move the second moving part 300 in a second direction perpendicular to the optical axis direction and the first direction. The second driving unit may rotate the second moving part 300 about the optical axis.

In the present embodiment, the first driving unit may comprise a first coil 430. The second driving unit may comprise a second coil 440. The first driving unit may comprise a first magnet 410 being used to interact with the first coil 430. The second driving unit may comprise a second magnet 420 being used to interact with the second coil 440. As a modified embodiment, the first driving unit and the second driving unit may comprise coils being individually controlled and a common magnet.

The camera device 10 may comprise a first magnet 410. The driving unit may comprise a first magnet 410. The first driving unit may comprise a first magnet 410. The first magnet 410 may be a magnet. The first magnet 410 may be a permanent magnet. The first magnet 410 may be used for auto focus (AF).

The first magnet 410 may be disposed in the fixed part 100. The first magnet 410 may be fixed to the fixed part 100. The first magnet 410 may be coupled to the fixed part 100. The first magnet 410 may be bonded to the fixed part 100 by an adhesive. The first magnet 410 may be disposed in the housing 130. The first magnet 410 may be fixed to the housing 130. The first magnet 410 may be coupled to the housing 130. The first magnet 410 may be bonded to the housing 130 by an adhesive. The first magnet 410 may be disposed at a corner of the housing 130. The first magnet 410 may be disposed to be biased toward a corner of the housing 130.

The first magnet 410 may be a two-pole magnetized magnet comprising one N-pole region and one S-pole region. As a modified embodiment, the first magnet 410 may be a 4-pole magnetized magnet comprising two N-pole regions and two S-pole regions. The inner surface of each unit magnet of the first magnet 410 may be an S pole and an outer surface may be an N pole. At this time, the inner surface of each unit magnet of the second magnet 420 may be an N pole and an outer surface may be an S pole. Conversely, the inner surface of each unit magnet of the first magnet 410 may be an N pole and an outer surface may be an S pole. At this time, the inner surface of each unit magnet of the second magnet 420 may be an S pole and an outer surface may be an N pole. As illustrated in FIG. 21b, the inner surface of the magnet is disposed in the order of S pole, N pole, and S pole from top to bottom, and the outer surface of the magnet may be disposed in the order of N pole, S pole, and N pole from top to bottom.

The first magnet 410 may comprise a plurality of magnets. The first magnet 410 may comprise four magnets. The first magnet 410 may comprise first to fourth unit magnets 411, 412, 413, and 414. The first to fourth unit magnets 411, 412, 413, and 414 may be disposed symmetrically with respect to the optical axis. The first to fourth unit magnets 411, 412, 413, and 414 may be formed to have the same size and shape.

The camera device 10 may comprise a second magnet 420. The driving unit may comprise a second magnet 420. The second driving unit may comprise a second magnet 420. The second magnet 420 may be a magnet. The second magnet 420 may be a permanent magnet. The second magnet 410 may be used for handshake correction (OIS).

The second magnet 420 may be disposed in the fixed part 100. The second magnet 420 may be fixed to the fixed part 100. The second magnet 420 may be coupled to the fixed part 100. The second magnet 420 may be bonded to the fixed part 100 by an adhesive. The second magnet 420 may be disposed in the housing 130. The second magnet 420 may be fixed to the housing 130. The second magnet 420 may be coupled to the housing 130. The second magnet 420 may be bonded to the housing 130 by an adhesive. The second magnet 420 may be disposed at a corner of the housing 130. The second magnet 420 may be disposed to be biased toward a corner of the housing 130.r The second magnet 420 may be a two-pole magnetized magnet comprising one N-pole region and one S-pole region. As a modified embodiment, the second magnet 420 may be a 4-pole magnetized magnet comprising two N-pole regions and two S-pole regions.

The second magnet 420 may comprise a plurality of magnets. The second magnet 420 may comprise four magnets. The second magnet 420 may comprise first to fourth unit magnets 421, 422, 423, and 424. The first to fourth unit magnets 421, 422, 423, and 424 may be disposed symmetrically with respect to the optical axis. The first to fourth unit magnets 421, 422, 423, and 424 may be formed to have the same size and shape.

The present embodiment may relate to an arrangement of an AF driver for moving the lens 220 and an OIS driver for shifting the image sensor 330. At this time, the vertical length of the AF magnet may be greater than the vertical length of the OIS magnet. When viewed from the top and side surfaces, the OIS magnet and the OIS coil may be protruded more outward than the bobbin 210 in x-axis, be eccentrically disposed at a corner, and overlapped with adjacent magnets in y-axis.

However, for AF driving, the AF magnet may be protruded more toward the center of the side portion than the corner so as to face the AF coil disposed in the bobbin 210 as much as possible. Accordingly, the OIS magnet may have more portions being protruded from the corner to the center side of the side portion than the OIS coil.

The AF magnet can also be protruded with the same size as the OIS magnet is protruded further toward the corner. However, even if it is not protruded, the performance may be irrelevant. AF magnet and OIS magnet are made integrally or can be made to have the same size for ease of assembly.

In addition, the OIS magnet can couple the AF magnet and the OIS magnet with 4 poles.

The first magnet 410 may be overlapped with the second magnet 420 in an optical axis direction. The first magnet 410 may be overlapped with the second magnet 420 in a vertical direction. The length of the first magnet 410 in an optical axis direction may be longer than the length of the second magnet 420. In a modified embodiment, the length of the first magnet 410 in an optical axis direction may be the same as the length of the second magnet 420. As another modified embodiment, the length of the first magnet 410 in an optical axis direction may be shorter than the length of the second magnet 420.r The first magnet 410 and the second magnet 420 may be disposed in an integrated type housing 130. The first magnet 410 may be directly coupled to the second magnet 420. The first magnet 410 may be coupled with the second magnet 420 and the yoke 425 interposed therebetween.

The first magnet 410 may be larger than the second magnet 420. The first magnet 410 may have a larger volume than the second magnet 420. The first magnet 410 may have a larger cross-sectional area than the second magnet 420. As a modified embodiment, the first magnet 410 may be formed to have the same size as the second magnet 420. In another modified embodiment, the first magnet 410 may be smaller than the second magnet 420.r The first magnet 410 may be a two-pole magnet. The second magnet 420 may be a two-pole magnet. However, each of the first magnet 410 and the second magnet 420 may be a part of a single 4-pole magnet. The first magnet 410 and the second magnet 420 may be separately formed and coupled. Or, the first magnet 410 and the second magnet 420 may constitute a single magnet.

The first magnet 410 may comprise a first unit magnet 411 and a second unit magnet 412 disposed opposite to each other with respect to an optical axis, and a third unit magnet 413 and a fourth unit magnet 414 disposed opposite to each other with respect to an optical axis. The first unit magnet 411 may comprise a first surface facing the first coil 430. The first unit magnet 411 may be overlapped with the third unit magnet 413 in a direction in which the first surface faces. The first unit magnet 411 may not be overlapped with the second unit magnet 412 in a direction in which the first surface faces.

The first unit magnet 411 may comprise a part being protruded to the outer side of the bobbin 210 in x-axis direction perpendicular to the optical axis direction. A part of the first unit magnet 411 may be overlapped with the third unit magnet 413 in an optical axis direction and y-axis direction perpendicular to the x-axis direction.

The second magnet 420 may comprise a first unit magnet 421 and a second unit magnet 422 being disposed opposite to each other with respect to an optical axis, and a third unit magnet 423 and a fourth unit magnet 424 being disposed opposite to each other with respect to an optical axis. The first unit magnet 421 may comprise a first surface facing the first coil 430. The first unit magnet 421 may be overlapped with the third unit magnet 423 in a direction in which the first surface faces. The first unit magnet 421 may not be overlapped with the second unit magnet 422 in a direction in which the first surface faces.

The second magnet 420 may not be overlapped with the bobbin 210 in a direction perpendicular to an optical axis direction. The second magnet 420 may comprise a part not being overlapped with the second coil 440 in an optical axis direction. The first unit magnet 421 of the second magnet 420 may comprise a part being protruded to the outer side of the second coil 440 in an optical axis direction and x-axis direction perpendicular to the y-axis direction. The first unit magnet 421 of the second magnet 420 may comprise a part not being overlapped with the second coil 440 in an optical axis direction.

The first coil 430 may be overlapped with the first magnet 410 in a direction perpendicular to the optical axis direction. The second coil 440 may be overlapped with the second magnet 420 in an optical axis direction. When a driving current in a first direction is applied to the first coil 430, the first moving part 200 may be moved downward in an optical axis direction to a first position. When a driving current in a second direction opposite to the first direction is applied to the first coil 430, the first moving part 200 may be moved upward in an optical axis direction to a second position. The first coil 430 may be overlapped with the first magnet 410 in a direction perpendicular to the optical axis direction both when the first moving part 200 is positioned at the first position and at the second position. That is, the first coil 430 may be overlapped with the first magnet 410 in a direction perpendicular to the optical axis direction in the entire section of the stroke of the first moving part 200 in an up-down direction.

As illustrated in FIG. 20, a neutral region having a neutral polarity may be disposed between the first magnet 410 and the second magnet 420 in the present embodiment. A neutral region having a neutral polarity may be formed between the first magnet 410 and the second magnet 420.r As illustrated in FIG. 21a, in a first modified embodiment, the first magnet 410 may be in contact with the second magnet 420. The first magnet 410 may be bonded to the second magnet 420 by an adhesive. The first magnet 410 may be coupled to the second magnet 420. The first magnet 410 may be fixed to the second magnet 420. The first magnet 410 may be disposed in the second magnet 420.

As illustrated in FIG. 21b, in a second modified embodiment, the first magnet 410 may be a two-pole magnet. The second magnet 420a may be a 4-pole magnet.

As illustrated in FIG. 22, in a third modified embodiment, the camera device 10 may comprise a yoke 425. The yoke 425 may be disposed between the first magnet 410 and the second magnet 420.r As illustrated in FIG. 23(a), in a fourth modified embodiment, the camera device 10 may comprise a yoke 425a. The yoke 425a may comprise a first portion disposed on the outer side surface of the second magnet 420 and a second portion being disposed between the first magnet 410 and the second magnet 420. The second portion may be bent from the first portion.

As illustrated in FIG. 23(b), in a fifth modified embodiment, the camera device 10 may comprise a yoke 425b. The yoke 425b may comprise a first portion being disposed on outer side surfaces of the first magnet 410 and the second magnet 420, and a second portion being disposed on an upper surface of the first magnet 410. The second portion may be bent from the first portion. The first magnet 410 and the second magnet 420 may be in contact with each other.

As illustrated in FIG. 23(c), in a sixth modified embodiment, the camera device 10 may comprise a yoke 425c. The yoke 425c may be disposed on an upper surface of the first magnet 410. The yoke 425c may be formed of a flat plate. The first magnet 410 and the second magnet 420 may be in contact with each other.

As illustrated in FIG. 23(d), in a seventh modified embodiment, the camera device 10 may comprise a yoke 425d. The yoke 425d may be disposed on outer side surfaces of the first magnet 410 and the second magnet 420. The yoke 425d may be formed of a flat plate. The first magnet 410 and the second magnet 420 may be in contact with each other.

As illustrated in FIG. 24, in an eighth modified embodiment, the first magnet 410 may be disposed to be long in length in a first direction perpendicular to the optical axis direction. In the optical axis direction and the second direction perpendicular to the first direction, the length of the first magnet 410 (refer to a of FIG. 24) may be longer than the length of the second magnet 420 (refer to b of FIG. 24).

As illustrated in FIG. 25, in a ninth modified embodiment, the first magnet 410 may be disposed to be long in length in a first direction perpendicular to the optical axis direction. The length of the first magnet 410 in a first direction (refer to a of FIG. 25) may be longer than the length of the second magnet 420 (refer to b of FIG. 25). In a first direction, the length b of the second magnet 420 may be longer than the length of the second coil 440 (refer to c of FIG. 25).

The present embodiment can solve the electromagnetic force optimization problem. As the driving stroke of the OIS and the driving stroke of the AF are increased and the size of the image sensor is increased, it may be necessary to optimize the electromagnetic force. The present embodiment may comprise a structure in which a coil and a magnet for driving OIS are separated from a coil and a magnet for AF.

In order to increase the electromagnetic force of OIS and AF, a double-pole magnetized magnet may be used as illustrated in FIG. 20. In this case, it can have a higher electromagnetic force compared to the case of OIS using mono-pole. In the present embodiment, the first coil 430, which is the AF coil, is made smaller in a heightwise direction compared to the first magnet 410 so that the first coil 430 is overlapped with the first magnet 410 in the entire moving section, so that the linearity can be maintained in the moving section. A neutral zone may be formed between the first magnet 410 and the second magnet 420.r Most of the AF electromagnetic force may be generated by the first coil 430 and the first magnet 410. Most of the OIS electromagnetic force may be generated by the second coil 440 and the second magnet 420. However, in the case of the OIS, there is an effect of increasing the electromagnetic force of the OIS by the first magnet 410.r In a modified embodiment, the first magnet 410 and the second magnet 420 can be used by attaching two magnets. At this time, the neutral zone between the two magnets may be deleted to improve the electromagnetic force. In the present embodiment, the first magnet 410, the second magnet 420, and the neutral zone 415 may be formed of one magnet. At this time, the first magnet 410 may be a first magnet portion and the second magnet 420 may be a second magnet portion.

In a modified embodiment, the electromagnetic force can be further increased by adding a yoke. Furthermore, it is possible to adjust the electromagnetic force for driving the OIS and AF through the position of the yoke. Since the AF driving stroke needs to be covered, the height of the first magnet 410 may be higher than the height of the second magnet 420. The second magnet 420 may have a greater height evacuation width. Although the height of the second magnet 420 is desirable to be high, the overall height of the camera device 10 may also be increased, which may cause a problem.

As a modified embodiment, the driving magnet may be formed as a single magnet.

The camera device 10 may comprise a first coil 430. The driving unit may comprise a first coil 430. The first coil 430 may be disposed in the first moving part 200. The first coil 430 may be fixed to the first moving part 200. The first coil 430 may be coupled to the first moving part 200. The first coil 430 may be bonded to the first moving part 200 by an adhesive. The first coil 430 may be disposed in the bobbin 210. The first coil 430 may be fixed to the bobbin 210. The first coil 430 may be coupled to the bobbin 210. The first coil 430 may be bonded to the bobbin 210 by an adhesive. The first coil 430 may be electrically connected to a driver IC 480. The first coil 430 may be electrically connected to a lower elastic member 720, a sensing substrate 470, and the driver IC 480. The first coil 430 may receive current from the driver IC 480.

The first coil 430 may be disposed at a position corresponding to the driving magnet 410. The first coil 430 may be disposed in the bobbin 210 at a position corresponding to the driving magnet 410. The first coil 430 may face the driving magnet 410. The first coil 430 may comprise a surface facing the driving magnet 410. The first coil 430 may be disposed adjacent to the driving magnet 410. The first coil 430 may interact with the driving magnet 410. The first coil 430 may electromagnetically interact with the driving magnet 410.

The first coil 430 may move the first moving part 200 in an optical axis direction. The first coil 430 may move the bobbin 210 in an optical axis direction. The first coil 430 may move the lens 220 in an optical axis direction. The first coil 430 may move the first moving part 200 in an upward direction of the optical axis direction. The first coil 430 may move the bobbin 210 in an upward direction of the optical axis direction. The first coil 430 may move the lens 220 in an upward direction of the optical axis direction. The first coil 430 may move the first moving part 200 in a downward direction of the optical axis direction. The first coil 430 may move the bobbin 210 in a downward direction of the optical axis direction. The first coil 430 may move the lens 220 in a downward direction of the optical axis direction.

The camera device 10 may comprise a second coil 440. The driving unit may comprise a second coil 440. The second coil 440 may be disposed in the second moving part 300. The second coil 440 may be fixed to the second moving part 300. The second coil 440 may be coupled to the second moving part 300. The second coil 440 may be bonded to the second moving part 300 by an adhesive. The second coil 440 may be disposed in the holder 340. The second coil 440 may be fixed to the holder 340. The second coil 440 may be coupled to the holder 340. The second coil 440 may be bonded to the holder 340 by an adhesive. The second coil 440 may be wound around the protrusion of the holder 340 and disposed. The second coil 440 may be disposed on the holder 340. The second coil 440 may be electrically connected to the second substrate 310. Both ends of the second coil 440 may be soldered to the second substrate 310. The second coil 440 may be electrically connected to the driver IC 495. The second coil 440 may be electrically connected to the second substrate 310 and the driver IC 495. The second coil 440 may receive current from the driver IC 495.

The second coil 440 may be disposed at a position corresponding to the second magnet 420. The second coil 440 may be disposed at a position corresponding to the second magnet 420 in the holder 340. The second coil 440 may face the second magnet 420. The second coil 440 may comprise a surface facing the second magnet 420. The second coil 440 may be disposed adjacent to the second magnet 420. The second coil 440 may interact with the second magnet 420. The second coil 440 may electromagnetically interact with the second magnet 420.

The second coil 440 may move the second moving part 300 in a direction perpendicular to the optical axis direction. The second coil 440 may move the second substrate 310 in a direction perpendicular to the optical axis direction. The second coil 440 may move the sensor substrate 320 in a direction perpendicular to the optical axis direction. The second coil 440 may move the image sensor 330 in a direction perpendicular to the optical axis direction. The second coil 440 may move the holder 340 in a direction perpendicular to the optical axis direction. The second coil 440 may rotate the second moving part 300 about an optical axis. The second coil 440 may rotate the second substrate 310 about an optical axis. The second coil 440 may rotate the sensor substrate 320 about an optical axis. The second coil 440 may rotate the image sensor 330 about an optical axis. The second coil 440 may rotate the holder 340 about an optical axis.

The second coil 440 may comprise a plurality of coils. The second coil 440 may comprise four coils. The second coil 440 may comprise a coil for shift in x-axis. The second coil 440 may comprise a coil for shift in y-axis.

The second coil 440 may comprise a second-first coil 441. The second-first coil 441 may be a first sub-coil. The second-first coil 441 may be a coil for x-axis shift. The second-first coil 441 may move the second moving part 300 in the x-axis direction. The second-first coil 441 may be disposed in length along the y-axis. The second-first coil 441 may comprise a plurality of coils. The second-first coil 441 may comprise two coils. The two coils of the second-first coil 441 may be electrically connected to each other. The second-first coil 441 may comprise a connection coil connecting the two coils. In this case, the two coils of the second-first coil 441 may receive current together. Or, the two coils of the second-first coil 441 may be electrically separated from each other to receive current individually.

The second coil 440 may comprise a second-second coil 442. The second-second coil 442 may be a second sub-coil. The second-second coil 442 may be a coil for y-axis shift. The second-second coil 442 may move the second moving part 300 in the y-axis direction. The second-second coil 442 may be disposed in length along the x-axis. The second-first coil 441 may comprise a plurality of coils. The second-second coil 442 may comprise two coils. Two coils of the second-second coil 442 may be electrically connected to each other. The second-second coil 442 may comprise a connection coil connecting the two coils. In this case, the two coils of the second-second coil 442 may receive current together. Or, the two coils of the second-second coil 442 may be electrically separated from each other to receive current individually.

The camera device 10 may comprise a Hall sensor 445. The Hall sensor 445 may be disposed in the second substrate 310. The Hall sensor 445 may be disposed in a hole of the holder 340. The Hall sensor 445 may comprise a Hall device (Hall IC). The Hall sensor 445 may detect the driving magnet 410. The Hall sensor 445 may detect a magnetic force of the driving magnet 410. The Hall sensor 445 may face the driving magnet 410. The Hall sensor 445 may be disposed at a position corresponding to the driving magnet 410. The Hall sensor 445 may be disposed adjacent to the driving magnet 410. The Hall sensor 445 may detect the position of the second moving part 300. The Hall sensor 445 may detect the movement of the second moving part 300. The Hall sensor 445 may be disposed in the hollow of the second coil 440. The sensed value detected by the Hall sensor 445 may be used to feedback the handshake correction operation. The Hall sensor 445 may be electrically connected to the driver IC 495.

The Hall sensor 445 may comprise a plurality of Hall sensors. The Hall sensor 445 may comprise three Hall sensors. The Hall sensor 445 may comprise first to third Hall sensors. The first Hall sensor may detect the displacement of the second moving part 300 in the x-axis direction. The second Hall sensor may detect the displacement of the second moving part 300 in the y-axis direction. The third Hall sensor may detect the rotation of the second moving part 300 about the z-axis alone or together with any one or more of the first Hall sensor and the second Hall sensor.

The camera device 10 may comprise a sensing magnet 450. The sensing magnet 450 may be disposed in the first moving part 200. The sensing magnet 450 may be fixed to the first moving part 200. The sensing magnet 450 may be coupled to the first moving part 200. The sensing magnet 450 may be bonded to the first moving part 200 by an adhesive. The sensing magnet 450 may be disposed in the bobbin 210. The sensing magnet 450 may be fixed to the bobbin 210. The sensing magnet 450 may be coupled to the bobbin 210. The sensing magnet 450 may be bonded to the bobbin 210 by an adhesive. The sensing magnet 450 may be formed to have a smaller size than the driving magnet 410. Through this, the influence of the sensing magnet 450 on driving may be minimized.

The sensing magnet 450 may be disposed opposite to a correction magnet 460. The sensing magnet 450 and the correction magnet 460 may be disposed opposite to each other in the first moving part 200. The sensing magnet 450 and the correction magnet 460 may be disposed opposite to each other in the bobbin 210.

The camera device 10 may comprise a correction magnet 460. The correction magnet 460 may be a compensation magnet. The correction magnet 460 may be disposed in the first moving part 200. The correction magnet 460 may be fixed to the first moving part 200. The correction magnet 460 may be coupled to the first moving part 200. The correction magnet 460 may be bonded to the first moving part 200 by an adhesive. The correction magnet 460 may be disposed in the bobbin 210. The correction magnet 460 may be fixed to the bobbin 210. The correction magnet 460 may be coupled to the bobbin 210. The correction magnet 460 may be bonded to the bobbin 210 by an adhesive. The correction magnet 460 may be formed to have a size smaller than that of the driving magnet 410. Through this, the influence of the correction magnet 460 on driving can be minimized. In addition, the correction magnet 460 may be disposed on the opposite side of the sensing magnet 450 to form a magnetic force balance with the sensing magnet 450. Through this, the tilt that may be generated by the sensing magnet 450 can be inhibited.

The camera device 10 may comprise a sensing substrate 470. The sensing substrate 470 may be a substrate. The sensing substrate 470 may be a printed circuit board (PCB). The sensing substrate 470 may be a flexible substrate. The sensing substrate 470 may be an FPCB. The sensing substrate 470 may be coupled to the first substrate 110. The sensing substrate 470 may be connected to the first substrate 110. The sensing substrate 470 may be electrically connected to the first substrate 110. The sensing substrate 470 may be soldered to the first substrate 110. The sensing substrate 470 may be disposed in the housing 130. The sensing substrate 470 may be fixed to the housing 130. The sensing substrate 470 may be coupled to the housing 130. The housing 130 may comprise a groove or hole having a shape corresponding to that of the sensing substrate 470. The sensing substrate 470 may be disposed in a groove or hole of the housing 130.

The camera device 10 may comprise a driver IC 480. The driver IC 480 may be an AF driver IC. The driver IC 480 may be electrically connected to the first coil 430. The driver IC 480 may apply a current to the first coil 430 to perform AF driving. The driver IC 480 may apply a power source to the first coil 430. The driver IC 480 may apply a current to the first coil 430. The driver IC 480 may apply a voltage to the first coil 430. The driver IC 480 may be disposed in the sensing substrate 470. The driver IC 480 may be disposed at a position corresponding to the sensing magnet 450. The driver IC 480 may be disposed to face the sensing magnet 450. The driver IC 480 may be disposed adjacent to the sensing magnet 450.

The driver IC 480 may comprise a sensor. The sensor may comprise a Hall IC. The sensor may be disposed at a position corresponding to the sensing magnet 450. The sensor may be disposed to face the sensing magnet 450. The sensor may be disposed adjacent to the sensing magnet 450. The sensor may detect the sensing magnet 450. The sensor may detect the magnetic force of the sensing magnet 450. The sensor may detect the position of the first moving part 200. The sensor may detect the movement of the first moving part 200. The detected value detected by the sensor may be used for feedback of autofocus driving.

The camera device 10 may comprise a gyro sensor 490. The gyro sensor 490 may be disposed in the first substrate 110. The gyro sensor 490 may detect the shaking of the camera device 10. The gyro sensor 490 may detect an angular velocity or a linear velocity caused by shaking of the camera device 10. The gyro sensor 490 may be electrically connected to the driver IC 495. The shaking of the camera device 10 detected by the gyro sensor 490 may be used to drive a handshake correction (OIS).

The camera device 10 may comprise a driver IC 495. The driver IC 495 may be an OIS driver IC. The driver IC 495 may be electrically connected to the second coil 440. The driver IC 495 may apply a current to the second coil 440 to perform OIS driving. The driver IC 495 may apply a power source to the second coil 440. The driver IC 495 may apply a current to the second coil 440. The driver IC 495 may apply a voltage to the second coil 440. The driver IC 495 may be disposed in the second substrate 310.

The camera device 10 may comprise a connection member. The connection member may be an interposer. The connection member may support the movement of the second moving part 300. The connection member may movably support the second moving part 300. The connection member may connect the second moving part 300 and the fixed part 100. The connection member may connect the first substrate 110 and the second substrate 310. The connection member may electrically connect the first substrate 110 and the second substrate 310. The connection member may guide the movement of the second moving part 300. The connection member may guide the second moving part 300 to move in a direction perpendicular to the optical axis direction. The connection member may guide the second moving part 300 to rotate about the optical axis. The connection member may limit the movement of the second moving part 300 in an optical axis direction.

The connection member may comprise a connection substrate 600. The connection member may comprise an elastic member for connecting the fixed part 100 and the second moving part 300. The connection member may comprise a leaf spring. The connection member may comprise a wire 800. The connection member may comprise a ball disposed between the fixed part 100 and the second moving part 300.

The camera device 10 may comprise a connection substrate 600. The connection substrate 600 may be a connection part. The connection substrate 600 may be a connection member. The connection substrate 600 may be a stretchable substrate. The connection substrate 600 may be a flexible substrate. The connection substrate 600 may be a flexible printed circuit board. The connection substrate 600 may be a flexible printed circuit board (FPCB). The connection substrate 600 may have flexibility in at least a part. The second substrate 310 and the connection substrate 600 may be integrally formed.

The connection substrate 600 may support the second moving part 300. The connection substrate 600 may support the movement of the second moving part 300. The connection substrate 600 may movably support the second moving part 300. The connection substrate 600 may connect the second moving part 300 and the fixed part 100. The connection substrate 600 may connect the first substrate 110 and the second substrate 310. The connection substrate 600 may electrically connect the first substrate 110 and the second substrate 310. The connection substrate 600 may guide the movement of the second moving part 300. The connection substrate 600 may guide the second moving part 300 to move in a direction perpendicular to the optical axis direction. The connection substrate 600 may guide the second moving part 300 to rotate about the optical axis. The connection substrate 600 may limit the movement of the second moving part 300 in an optical axis direction. A portion of the connection substrate 600 may be coupled to the base 120.

The connection substrate 600 may comprise two connection substrates 600 being spaced apart from each other and formed symmetrically. Two connection substrates 600 may be disposed at both sides of the second substrate 310. The connection substrate 600 may be bent a total of 6 times to connect the first substrate 110 and the second substrate 310.

The connection substrate 600 may comprise a first region connected to the second substrate 310 and being bent in an optical axis direction. The first region is connected to the second substrate 310 and may be bent in an optical axis direction. The first region is connected to the second substrate 310 and may be extended in an optical axis direction. The first region may be connected to the second substrate 310 and extended by being bent in an optical axis direction. The connection substrate 600 may comprise a second region being extended from the first region. The connection substrate 600 may comprise a third region that is bent in a direction perpendicular to the optical axis direction in the second region. The third region may be bent in a direction perpendicular to the optical axis direction in the second region. The third region may be extended in a direction perpendicular to the optical axis direction in the second region. The third region may be bent and extended in a direction perpendicular to the optical axis direction in the second region.

The connection substrate 600 may comprise a connection part 610 comprising a first region. The connection substrate 600 may comprise an extension part 620 comprising a second region and a third region. The connection substrate 600 may comprise a connection part 610 being connected to the second substrate 310. The connection substrate 600 may comprise an extension part 620 being extended from the connection part 610. The connection substrate 600 may comprise a terminal part 630 being connected to the extension part 620 and comprising a terminal.

The connection substrate 600 may comprise a connection part 610. The connection part 610 may be connected to the second moving part 300. The connection part 610 may be coupled to the second moving part 300. The connection part 610 may be fixed to the second moving part 300. The connection part 610 may be connected to the second substrate 310. The connection part 610 may be coupled to the second substrate 310. The connection part 610 may be fixed to the second substrate 310. The connection part 610 may comprise a first bending region that is bent in an optical axis direction. The connection part 610 may comprise a first bending region being cut and bent in the optical axis direction. The connection part 610 may comprise a first bending region being extended in an optical axis direction. The connection part 610 may comprise a first region that is bent in an optical axis direction with respect to the second substrate 310 and a second region being extended from the first region and bent in a direction perpendicular to the optical axis direction.

The connection substrate 600 may comprise an extension part 620. The extension part 620 may connect the connection part 610 and the terminal part 630. The extension part 620 may be extended from the connection part 610. The extension part 620 may comprise a second bending region that is bent in a direction perpendicular to the optical axis direction. The bending angle of the extension part 620 may be 80 to 100 degrees. The bending angle of the extension part 620 may be 85 to 95 degrees.

Any one of the bending region of the connection part 610 and the bending region of the extension part 620 may be referred to as a first bending region, and the other may be referred to as a second bending region.

The connection substrate 600 may comprise a terminal part 630. The terminal part 630 may be coupled to the fixed part 100. The terminal part 630 may be fixed to the fixed part 100. The terminal part 630 may be coupled to the first substrate 110. The terminal part 630 may be connected to the first substrate 110. The terminal part 630 may be soldered to the first substrate 110. The terminal part 630 may be fixed to the first substrate 110. The terminal part 630 may be coupled to the base 120. The terminal part 630 may be fixed to the base 120. The terminal part 630 may comprise a terminal. The terminal may be coupled to the first substrate 110.

In the present embodiment, the camera device 10 may comprise a flexible substrate. The flexible substrate may connect the fixed part 100 and the second moving part 300. The flexible substrate may comprise a connection part 610 being connected to the second moving part 300, an extension part 620 being extended from the connection part 610, and a terminal part 630 being connected to the extension part 620 and comprising a terminal.

In the present embodiment, the connection substrate 600 may comprise a first part being coupled to the first substrate 110, a second part being coupled to the second substrate 310, and a third part connecting the first part and the second part. The third part may be disposed parallel to an optical axis at least in part. The third part may be formed so that the length in an optical axis direction is longer than the thickness. The second part of the connection substrate 600 may be disposed parallel to the second substrate 310 at least in part. The third part of the connection substrate 600 may be disposed perpendicular to the second part at least in part. The third part of the connection substrate 600 may be bent roundly in the portion corresponding to the corner of the second substrate 310. The second substrate 310 may comprise a first side surface and a second side surface being disposed opposite to each other, and a third side surface and a fourth side surface being disposed opposite to each other. The second part of the connection substrate 600 may be coupled with the first side surface and the second side surface of the second substrate 310. The first part of the connection substrate 600 may be coupled to a portion of the first substrate 110 corresponding to the third side surface and the fourth side surface of the second substrate 310.

The camera device 10 may comprise a metal plate 650. The connection member may comprise a metal plate 650. The connection substrate 600 may comprise a metal plate 650. However, the metal plate 650 may be understood as a configuration separate from the connection substrate 600. The metal plate 650 may be a metal member. The metal plate 650 may be a metal part. The metal plate 650 may be a metal layer. The metal plate 650 may be a metal thin film. The metal plate 650 may be formed of metal. The metal plate 650 may be formed of an alloy. The metal plate 650 may be formed of a copper alloy. The metal plate 650 may be formed of a conductive material. The metal plate 650 may be distinguished from the conductive layer 602 of the connection substrate 600. The metal plate 650 may be formed of a material different from the conductive layer 602 of the connection substrate 600. The metal plate 650 may be coupled to the connection substrate 600. The metal plate 650 may have elasticity.

In an optical axis direction, at least in part, the length of the metal plate 650 may be the same as the length of the extension part 620. The metal plate 650 may be extended to have the same length as the extension part 620 in an optical axis direction. The thickness of the metal plate 650 may be the same as the thickness of the connection substrate 600. The thickness of the metal plate 650 may be thicker than the thickness of the connection substrate 600. The thickness of the conductive layer 602 may be 7 to 50 μm. The thickness of the metal plate 650 may be 20 to 150 μm. The metal plate 650 may be connected to the ground GND to be used for impedance matching and noise suppression.

At least a portion of the metal plate 650 may be disposed in the extension part 620 of the connection substrate 600. The extension part 620 may comprise a bending region that is bent in a direction perpendicular to the optical axis direction. At this time, the metal plate 650 may be disposed in the bending region. The metal plate 650 may be disposed on an inner surface of the extension part 620. The metal plate 650 may be disposed on an outer surface of the extension part 620.

The metal plate 650 may be formed of a conductive material. The metal plate 650 may be electrically connected to the second substrate 310. The metal plate 650 may be electrically connected to the image sensor 330. The metal plate 650 may be electrically connected to the driver IC 495. The metal plate 650 may be connected to the terminal 631 of the connection substrate 600. The metal plate 650 may be electrically connected to the terminal 631 of the connection substrate 600. The metal plate 650 may be in direct contact with the terminal 631 of the connection substrate 600. The metal plate 650 may be coupled to the terminal 631 of the connection substrate 600 by a conductive member. The metal plate 650 may be used as a ground (GND). The metal plate 650 may be connected to the ground terminal of the connection substrate 600. The metal plate 650 may be electrically connected to the first substrate 110. In this case, the number of power connection patterns of the connection substrate 600 may be reduced.

The metal plate 650 may comprise a body part disposed in the extension part 620 and a protruded part 660 being extended downward from the body part to the terminal 631 of the connection substrate 600. The protruded part 660 may be a protrusion. The protruded part 660 may be connected to the terminal 631 of the connection substrate 600. The protruded part 660 may be electrically connected to the terminal 631 of the connection substrate 600. The protruded part 660 may be coupled to the terminal 631 of the connection substrate 600. The protruded part 660 may be coupled to the terminal 631 of the connection substrate 600 by a conductive member. The protruded part 660 may be fixed to the terminal 631 of the connection substrate 600. The protruded part 660 may be in direct contact with the terminal 631 of the connection substrate 600. The protruded part 660 may be connected to a ground terminal of the connection substrate 600.r As illustrated in FIG. 15(b), the connection substrate 600 may comprise two insulation layers 601 and a conductive layer 602 disposed between the two insulation layers 601. The metal plate 650 may comprise a material different from that of the conductive layer 602. The conductive layer 602 may be a conduction layer. The conductive layer 602 may be formed of copper. The metal plate 650 may be formed of a copper alloy. The metal plate 650 may comprise at least one of an alloy of copper and titanium and an alloy of copper and nickel. The thickness of the metal plate 650 may be thicker than the thickness of the conductive layer 602. The thickness of the conductive layer 602 may correspond to the distance between the two insulation layers 601. In the present embodiment, the connection substrate 600 may be formed only with two insulation layers 601 and a conductive layer 602 disposed between the two insulation layers 601. The insulation layer 601 may be formed of polyimide (Pi).

The camera device 10 may comprise an insulation layer. The connection member may comprise an insulation layer. The connection substrate 600 may comprise an insulation layer. The insulation layer may cover the metal plate 650. An insulation layer may be disposed on an outer surface of the metal plate 650. The metal plate 650 may be disposed between the insulation layers. The insulation layer may comprise an insulation material. The insulation layer may be formed of polyimide (Pi). The insulation layer may protect the metal plate 650.r The present embodiment can solve the signal processing problem of the image sensor 330. The present embodiment may provide a method for connecting the signals and power of the image sensor 330, the Hall sensor 445, and the driver IC 495 to the first substrate 110, which is the main PCB. The connection substrate 600 may be coupled to a metal plate 650 formed of a material of copper (Cu) or a copper-titanium alloy (cu+Ti).

The camera device 10 may comprise an elastic member 700. The elastic member 700 may be a support member. The elastic member 700 may connect the fixed part 100 and the first moving part 200. The elastic member 700 may elastically connect the fixed part 100 and the first moving part 200. The elastic member 700 may connect the bobbin 210 and the housing 130. The elastic member 700 may elastically connect the bobbin 210 and the housing 130. The elastic member 700 may movably support the first moving part 200 with respect to the fixed part 100. The elastic member 700 may be deformed when the first moving part 200 moves. When the movement of the first moving part 200 is finished, the elastic member 700 may position the first moving part 200 to an initial position through a restoring force (elastic force). The elastic member 700 may comprise a leaf spring. The elastic member 700 may comprise a spring. The elastic member 700 may have elasticity at least in part. The elastic member 700 may provide a restoring force (elastic force) to the first moving part.

The camera device 10 may comprise an upper elastic member 710. The elastic member 700 may comprise an upper elastic member 710. The upper elastic member 710 may be disposed on the lower elastic member 720. The upper elastic member 710 may comprise an inner side portion coupled to the bobbin 210. The inner side portion of the upper elastic member 710 may be coupled to an upper portion of the bobbin 210. The inner side portion of the upper elastic member 710 may be disposed on an upper surface of the bobbin 210. The upper elastic member 710 may comprise an outer side portion coupled to the housing 130. The outer side portion of the upper elastic member 710 may be coupled to a lower portion of the housing 130. The outer side portion of the upper elastic member 710 may be disposed on a lower surface of the housing 130. The upper elastic member 710 may comprise a connection part connecting the inner side portion and the outer side portion. The connection part may have elasticity.

The camera device 10 may comprise a lower elastic member 720. The elastic member 700 may comprise a lower elastic member 720. The lower elastic member 720 may be disposed below the upper elastic member 710. The lower elastic member 720 may comprise an inner side portion being coupled to the bobbin 210. An inner side portion of the lower elastic member 720 may be coupled to a lower portion of the bobbin 210. An inner side portion of the lower elastic member 720 may be disposed on a lower surface of the bobbin 210. The lower elastic member 720 may comprise an outer side portion being coupled to the housing 130. An outer side portion of the lower elastic member 720 may be coupled to an upper portion of the housing 130. An outer side portion of the lower elastic member 720 may be disposed on an upper surface of the housing 130. The lower elastic member 720 may comprise a connection part connecting the inner side portion and the outer side portion. The connection part may have elasticity.

The lower elastic member 720 may comprise a plurality of lower portion elastic units. The lower elastic member 720 may comprise first and second lower portion elastic units 720-1 and 720-2. The lower elastic member 720 may comprise two lower portion elastic units 720-1 and 720-2. The two lower portion elastic units 720-1 and 720-2 are spaced apart from each other to electrically connect the sensing substrate 470 and the first coil 430.

The camera device 10 may comprise a wire 800. The wire 800 may be a wire spring. The wire 800 may be an elastic member. The wire 800 may be a leaf spring in a modified embodiment. The wire 800 may connect the fixed part 100 and the second moving part 300. The wire 800 may elastically connect the fixed part 100 and the second moving part 300. The wire 800 may connect the housing 130 and the second substrate 310. The wire 800 may elastically connect the housing 130 and the second substrate 310. The wire 800 may movably support the second moving part 300. The wire 800 may support the second moving part 300 to move or rotate in a direction perpendicular to the optical axis direction.

An interposer that can simultaneously perform the roles of: electrical connection for connecting the signals of the image sensor 330 and driver IC 495 of sensor-shift OIS to the first substrate 110 which is the main PCB; and mechanical works on impact reliability and the like, may be absolutely necessary. The present embodiment may comprise an interposer that can secure the same characteristics. The interposer may be a connection member. The interposer may comprise a connection substrate 600 and a metal plate 650. The sensing substrate 470 may be electrically connected to the connection substrate 600. The connection substrate 600 may be an interposer PCB. The metal plate 650 may be formed of a copper material. The metal plate 650 may be formed of an alloy of copper (Cu) and titanium (Ti). The metal plate 650 may be a spring. The metal plate 650 may be an elastic member. The metal plate 650 may have elasticity. The spring can be used for reinforcing the ground (GND). Even when the allowable current needs to be high due to an increase in the size of the image sensor 330, impedance matching may be facilitated by using the GND connection through the metal plate 650 according to the present embodiment. The shape of the spring may be deformed in various forms, and the spring constant K may be lowered. As for the spring constant, K in the rotation direction may be one or more times higher than in the X and Y directions, and K in the Z direction may be 50 times higher or more. The metal plate 650 may be omitted. However, even in this case, the target value of the spring constant may be set to be the same. The interposer is easy to move in the X and Y directions and may be difficult to move in the Z direction.

By adopting the connection substrate 600 and the metal plate 650, it is possible to easily manage the bending portion and manage the tolerance. By increasing the spring constant k compared to the connection substrate 600 as a single product, the influence of the connection substrate 600 can be reduced compared to the influence of the spring. For easy tuning, the first order resonance frequency of OIS should be within 40 to 150 Hz, and the resonant frequency regarding the rotational direction may be set higher than the first order resonant frequency. The weight of the second moving part 300 comprising the image sensor 330 and the second substrate 310 may be 2 g or less, and the spring constant k value may be 100 N/m or more. The first order resonant frequency and third order resonant frequency can be managed at 100 Hz or more to facilitate tuning. The interposer substrate may be the second substrate 310. A hole may be formed in the center of the interposer substrate.

A driver IC and a Hall element are disposed in the second substrate 310, and the rigid portion of the second substrate 310 and the FPCB portion of the connection substrate 600 can be electrically connected in two or more portions. At this time, it can be connected in 2 to 4 portions. The FPCB can be bent twice. Since the bending portion of the connection substrate 600 does not have a large driving displacement and the shape must be maintained, the spring or GND may be wider than other positions. The bending angle of the connection substrate 600 may be 80 to 100 degrees. The present embodiment may comprise an actuator that connects the circuit signal to the main PCB using the sensor-shift connection substrate 600. In the present embodiment, a spring may be added to a portion of the interposer. The interposer may be electrically connected to the ground GND. The first order resonant frequency may be within 40 to 150 Hz. The rotation mode is positioned between the first order resonance frequency and the tilt mode, and the rotation frequency may be one or more times the first order resonance frequency. The interval between the first order resonant frequency and the third order resonant frequency may be 100 Hz or more. The spring constant k in the X, Y direction and Z direction of the connection member, which is a coupled body of the connection substrate 600 and the metal plate 650, may be 50 times higher than k in the Z direction.

In a present embodiment, the first order resonance point may be located within 60 to 80 Hz, the second order resonance point may be located within 150 to 170 Hz, and the third order resonance point may be located within 290 to 310 Hz. The gain value is higher at the first order resonance point than that of at the second order resonance point, and may be higher at the second order resonance point than that of at the third order resonance point. For reference, when the voltage that forms a force in x-axis direction is applied as a sine wave, a point at which the output voltage is maximally generated rather than the input voltage may be the first order resonance point. A point at which rotation occurs may be a second order resonance point. A point at which the tilt occurs may be a third order resonance point. When measuring the resonance point, the waveform may be a sine wave. The frequency may be 5 Hz to 10 KHz. The sweep may be 300 steps/sweep. The power source may be 0 VDC and 100 mV p-p. The lens weight may be 0.097 g.

Hereinafter, the operation of the camera device according to the present embodiment will be described with reference to the drawings.

Figure 27:
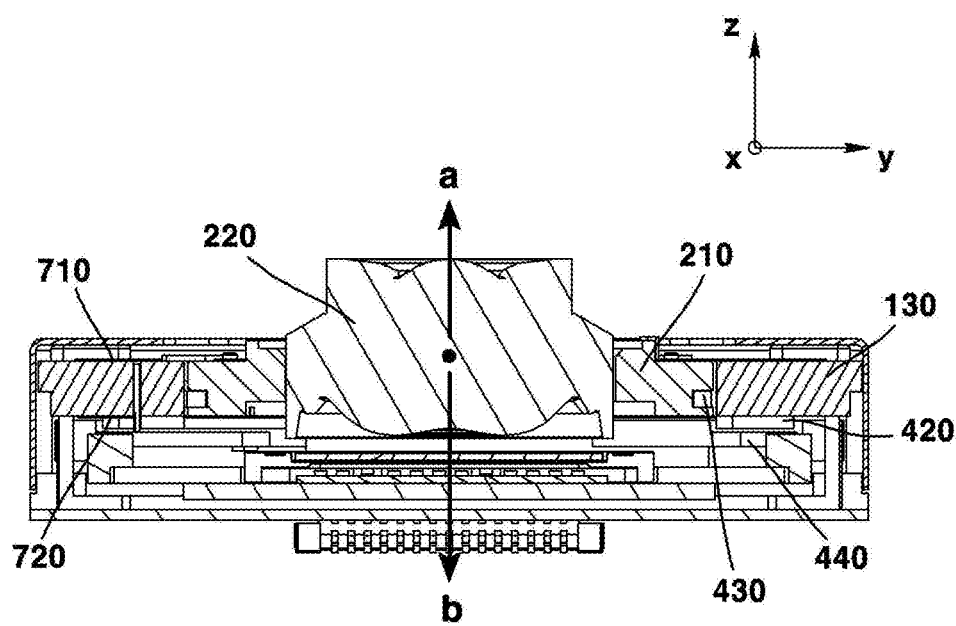
FIG. 27 is a diagram for explaining driving of an autofocus function of a camera device according to the present embodiment.

FIG. 27 is a view for explaining the operation of the autofocus function of a camera device according to the present embodiment.

When a power source is applied to the first coil 430 of the camera device 10 according to the present embodiment, an electromagnetic field is formed in the first coil 430, and the first coil 430 may move in an optical axis direction (z-axis direction) through electromagnetic interaction with the driving magnet 410. At this time, the first coil 430 may move in an optical axis direction together with the first moving part 200 comprising the lens 220. In this case, since the lens 220 moves away from or closer to the image sensor 330, the focus of the subject may be adjusted. In order to apply a power source to the first coil 430, any one or more of a current and a voltage may be applied.

When a current in a first direction is applied to the first coil 430 of the camera device 10 according to the present embodiment, the first coil 430 moves in an upward direction of the optical axis direction through electromagnetic interaction with the driving magnet 410 (refer to a of FIG. 27). At this time, the first coil 430 may move the lens 220 in an upward direction of the optical axis direction to move it away from the image sensor 330.

When a current in a second direction opposite to the first direction is applied to the first coil 430 of the camera device 10 according to the present embodiment, The first coil 430 may move in a lower direction (refer to b of FIG. 27) of the optical axis direction through electromagnetic interaction with the driving magnet 410. At this time, the first coil 430 may move the lens 220 in a lower direction of the optical axis to be closer to the image sensor 330.

Figure 28:
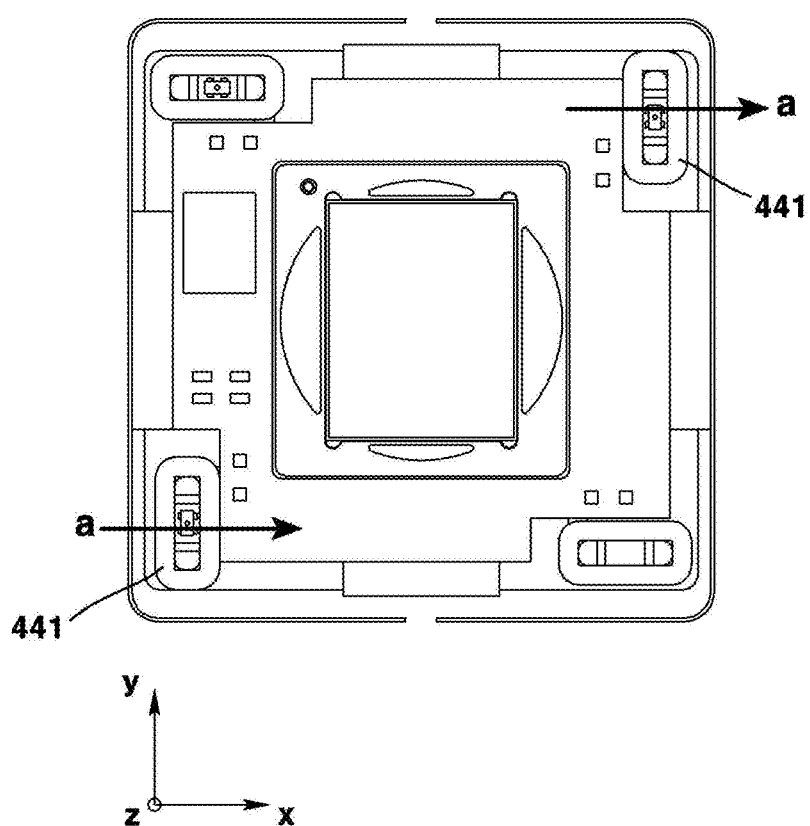
FIGS. 28 to 30 are diagrams for explaining the operation of the hand shake correction function of a camera device according to the present embodiment. In more detail.
Figure 29:
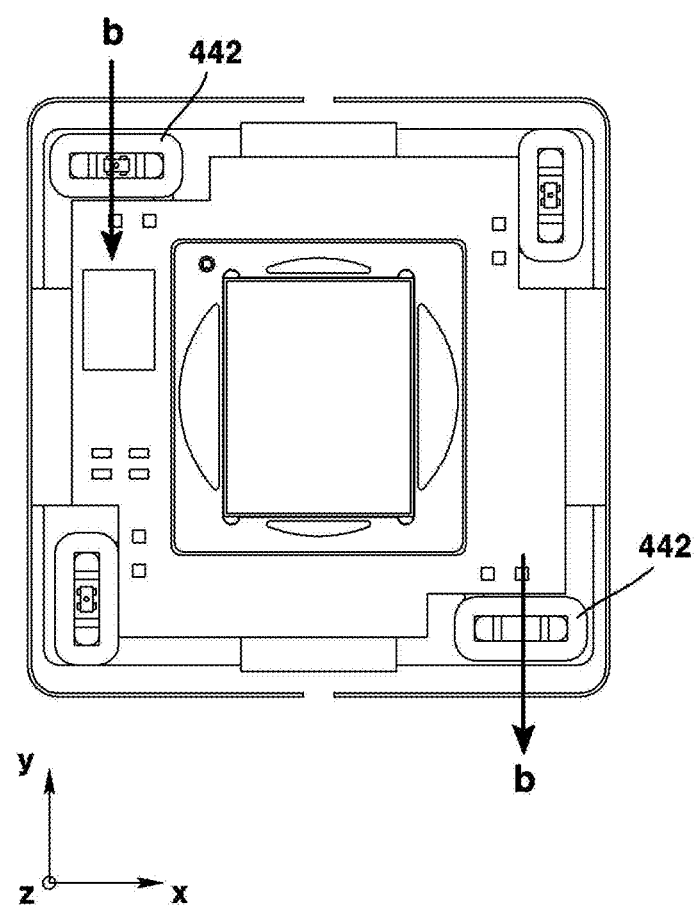
Figure 30:
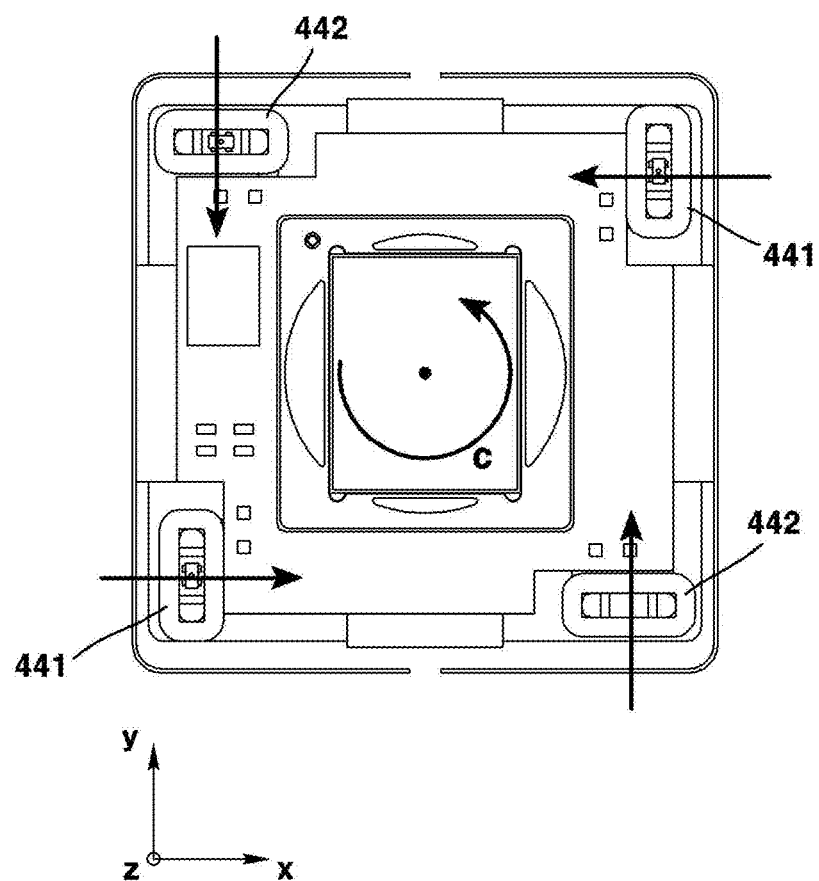

FIGS. 28 to 30 are diagrams for explaining the operation of the handshake correction function of a camera device according to the present embodiment.

When a power source is applied to the second coil 440 of the camera device 10 according to the present embodiment, an electromagnetic field is formed in the second coil 440 and the second coil 440 may move in a direction perpendicular to the optical axis direction through electromagnetic interaction with the driving magnet 410. In addition, the second coil 440 may rotate with respect to the optical axis through electromagnetic interaction with the driving magnet 410. At this time, the second coil 440 may move or rotate together with the second moving part 300 comprising the image sensor 330. In the present embodiment, the second coil 440 may move the image sensor 330 so that the shaking of the camera device 10 detected by the gyro sensor 490 is compensated.

FIG. 28 is a diagram for explaining driving in which the image sensor of the camera device according to the present embodiment is shifted along the x-axis.

When the current in a first direction is applied to the second-first coil 441 of the camera device 10 according to the present embodiment, the second-first coil 441 may move in one direction (refer to a of FIG. 20) of a first direction (x-axis direction) perpendicular to the optical axis direction through electromagnetic interaction with the driving magnet 410. At this time, the second-first coil 441 may move the image sensor 330 in one direction of a first direction perpendicular to the optical axis direction. Conversely, when a current in a second direction opposite to the first direction is applied to the second-first coil 441, the second-first coil 441 may move in the other direction of the first direction (x-axis direction) perpendicular to the optical axis direction through electromagnetic interaction with the driving magnet 410. At this time, the second-first coil 441 may move the image sensor 330 in the other of the first direction perpendicular to the optical axis direction.

FIG. 29 is a diagram for explaining driving in which an image sensor of a camera device according to the present embodiment is shifted along the y-axis.

When the current in a first direction is applied to the second-first coil 442 of the camera device 10 according to the present embodiment, the second-second coil 442 may move in one direction (refer to b of FIG. 29) of the first direction (y-axis direction) perpendicular to the optical axis direction through electromagnetic interaction with the driving magnet 410. At this time, the second-second coil 442 may move the image sensor 330 in one of the second directions perpendicular to the optical axis direction. Conversely, when a current in a second direction opposite to the first direction is applied to the second-second coil 442, the second-second coil 442 may move in the other direction of the first direction (y-axis direction) perpendicular to the optical axis direction through electromagnetic interaction with the driving magnet 410. At this time, the second-second coil 442 may move the image sensor 330 in the other of the second direction perpendicular to the optical axis direction.

FIG. 30 is a view for explaining the driving of an image sensor of a camera device according to the present embodiment is rolled around the z-axis.

When the current in the first direction is applied to the second-first coil 441 and the second-second coil 442 of the camera device 10 according to the present embodiment, the second-first coil 441 and the second-second coil 442 may rotate in one direction about the optical axis through electromagnetic interaction with the driving magnet 410 (refer to c of FIG. 30). At this time, the second-first coil 441 and the second-second coil 442 may rotate the image sensor 330 in one direction about the optical axis. At this time, one direction may be counterclockwise. Conversely, when a current in a second direction opposite to the first direction is applied to the second-first coil 441 and the second-second coil 442, the second-first coil 441 and the second-second coil 442 may rotate in other directions about the optical axis through electromagnetic interaction with the driving magnet 410. At this time, the second-first coil 441 and the second-second coil 442 may rotate the image sensor 330 in other direction about the optical axis. At this time, the other direction may be clockwise.

Hereinafter, an optical device according to the present embodiment will be described with reference to the drawings.

Figure 31:
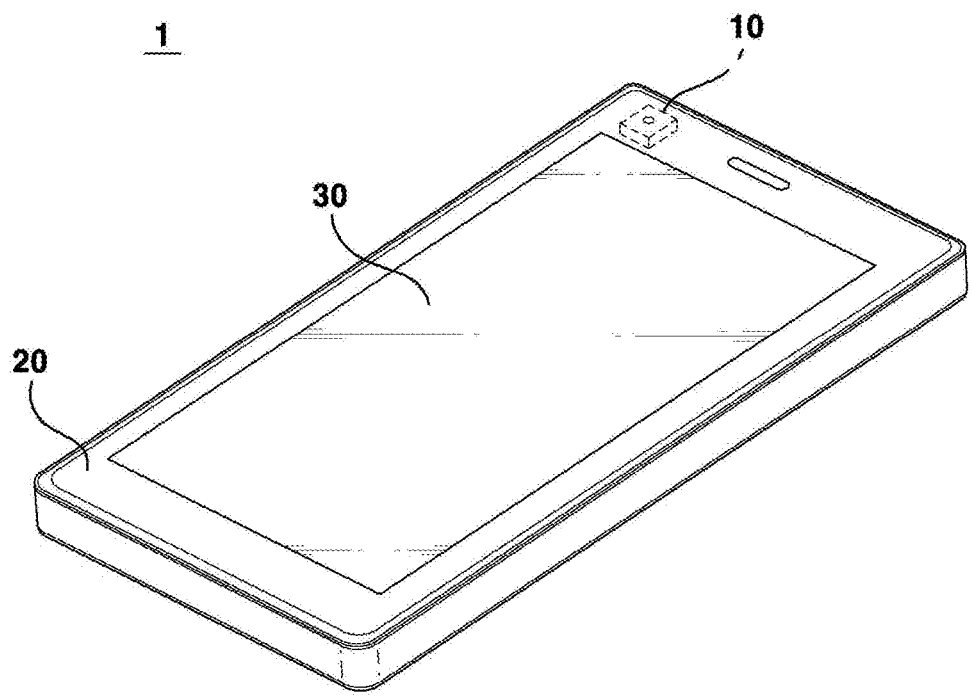
FIG. 31 is a perspective view of an optical device according to the present embodiment.
Figure 32:
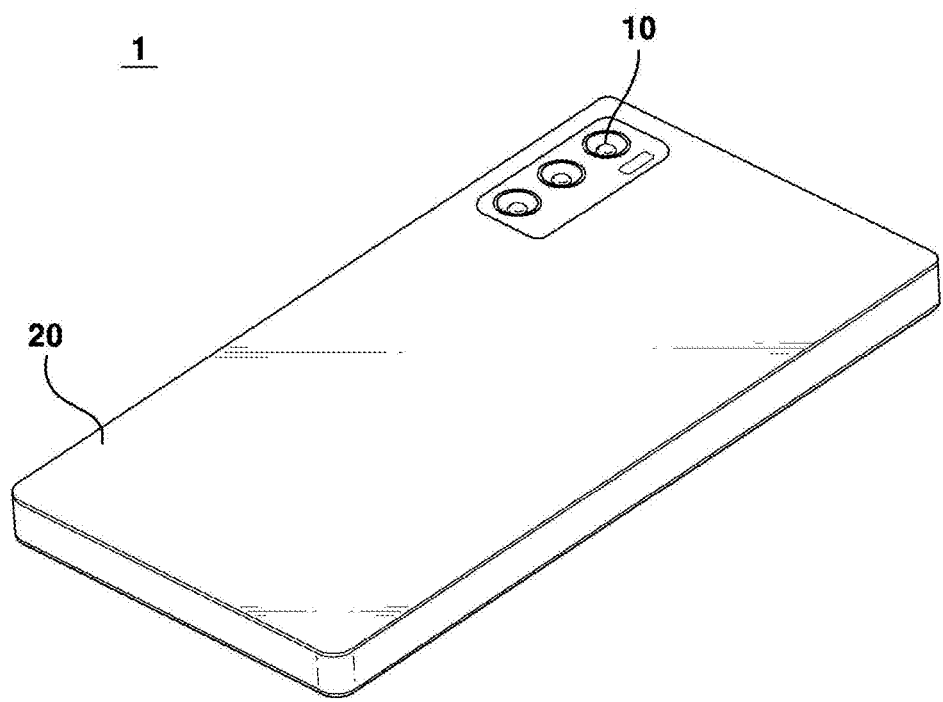
FIG. 32 is a perspective view of an optical device according to the present embodiment as viewed from a different direction from FIG. 31.

FIG. 31 is a perspective view of an optical device according to the present embodiment, and FIG. 32 is a perspective view of an optical device according to the present embodiment as viewed from a different direction from FIG. 31.

The optical device 1 may comprise any one or more among hand phone, portable phone, portable terminal, mobile terminal, smart phone, smart pad, portable smart device, digital camera, laptop computer, digital broadcasting terminal, personal digital assistants (PDA), portable multimedia player (PMP), and navigation. The optical device 1 may comprise any device for photographing an image or a picture.

The optical device 1 may comprise a main body 20. The optical device 1 may comprise a camera device 10. The camera device 10 may be disposed in the main body 20. The camera device 10 may photograph a subject. The optical device 1 may comprise a display 30. The display 30 may be disposed in the main body 20. The display 30 may output any one or more of a video and an image photographed by the camera device 10. The display 30 may be disposed on a first surface of the main body 20. The camera device 10 may be disposed on any one or more of a first surface of the main body 20 and a second surface opposite to the first surface.

Although the embodiment of the present invention has been described above with reference to the accompanying drawings, those of ordinary skill in the art to which the present invention belongs will understand that the present invention may be embodied in other specific forms without changing the technical spirit or essential features thereof. Therefore, it should be understood that the embodiments described above are illustrative in all respects and not restrictive.

The invention claimed is:

1. A camera device comprising:
a fixed part;
a first moving part comprising a bobbin and a lens coupled to the bobbin and disposed in the fixed part;
a second moving part comprising an image sensor and disposed in the fixed part;
a first magnet and a second magnet disposed on the fixed part;
a first coil disposed on the first moving part and disposed at a position corresponding to the first magnet; and
a second coil disposed on the second moving part and disposed at a position corresponding to the second magnet,
wherein the first coil is configured to move the first moving part in an optical axis direction,
wherein the first magnet is overlapped with the second magnet in the optical axis direction,
wherein the first magnet comprises a first unit magnet and a second unit magnet disposed opposite to each other with respect to an optical axis, and a third unit magnet and a fourth unit magnet disposed opposite to each other with respect to the optical axis,
wherein the first unit magnet comprises a part protruding to an outside of the bobbin in a x-axis direction perpendicular to the optical axis direction, and
wherein the part of the first unit magnet is overlapped with the third unit magnet in a y-axis direction perpendicular to the optical axis direction and the x-axis direction.

2. The camera device of claim 1, wherein the first unit magnet comprises a first surface facing the first coil, and
wherein the first unit magnet is overlapped with the third unit magnet in a direction perpendicular to the first surface.

3. The camera device of claim 2, wherein, when viewed in a direction in which the first surface faces, a horizontal length of the second coil is greater than a horizontal length of the second magnet.

4. The camera device of claim 2, wherein, when viewed from above, the second coil is disposed on an outer side of the bobbin, and
wherein, when viewed in a direction in which the first surface faces, the second coil comprises a part disposed below the bobbin and protruding further than an edge of the bobbin.

5. The camera device of claim 2, wherein the third unit magnet is elongated in the direction perpendicular to the first surface.

6. The camera device of claim 2, wherein the first unit magnet is not overlapped with the second unit magnet in a direction in which the first surface faces.

7. The camera device of claim 2, wherein the fixed part comprises a first side portion between a first corner portion and a second corner portion,
- wherein the first unit magnet is elongated on the first side portion in an arrangement direction of the first side portion, and
- wherein the first unit magnet is disposed closer to the first corner portion than to the second corner portion.

8. The camera device of claim 7, wherein the fixed part comprises a third side portion between the first corner portion and a fourth corner portion,
- wherein the third unit magnet is elongated on the third side portion in an arrangement direction of the third side portion, and
- wherein the third unit magnet is disposed closer to the fourth corner portion than to the first corner portion.

9. The camera device of claim 1, wherein the part of the first magnet is overlapped with the second coil in the optical axis direction.

10. The camera device of claim 1, wherein the second magnet comprises a part not overlapped with the second coil in the optical axis direction.

11. The camera device of claim 1, wherein the first magnet comprises a first pole formed on a first surface facing the first coil, and a second pole formed on a second surface opposite to the first surface, and
- wherein the second magnet comprises a second pole overlapped with the first pole of the first magnet in the optical axis direction, and a first pole overlapped with the second pole of the first magnet in the optical axis direction.

12. The camera device of claim 1, wherein, in the optical axis direction, a length of the first magnet is greater than a length of the second magnet.

13. The camera device of claim 1, wherein the first magnet is bonded with the second magnet by an adhesive.

14. The camera device of claim 1, comprising a yoke disposed between the first magnet and the second magnet.

15. An optical device comprising:
- a main body;
- the camera device of claim 1 disposed on the main body; and
- a display disposed on the main body and configured to output a video or an image photographed by the camera device.

16. A camera device comprising:
- a fixed part;
- a first moving part comprising a bobbin and configured to move in an optical axis direction;
- a second moving part comprising an image sensor and configured to move in a direction perpendicular to the optical axis direction;
- a first magnet and a second magnet disposed on the fixed part;
- a first coil disposed on the first moving part and disposed at a position corresponding to the first magnet; and
- a second coil disposed on the second moving part and disposed at a position corresponding to the second magnet,
- wherein the bobbin comprises first to fourth side surfaces,
- wherein the first magnet comprises a first unit magnet disposed to correspond to the first side surface of the bobbin, a second unit magnet disposed to correspond to the second side surface of the bobbin, and a third unit magnet disposed to correspond to the third side surface of the bobbin,
- wherein the first side surface of the bobbin and the second side surface of the bobbin are disposed opposite to each other in a y-axis direction perpendicular to the optical axis direction,
- wherein a portion of the first unit magnet is overlapped with the third unit magnet in the y-axis direction, and
- wherein the first unit magnet, the second unit magnet, and the third unit magnet are configured to move the first moving part in the optical axis direction.

17. The camera device of claim 16, wherein the first unit magnet is disposed between a first corner of the fixed part and a second corner of the fixed part and is disposed closer to the first corner than to the second corner.

18. A camera device comprising:
- an image sensor configured to move in a direction perpendicular to an optical axis direction;
- a housing disposed on the image sensor;
- a bobbin disposed in the housing;
- a lens coupled to the bobbin;
- a first magnet and a second magnet disposed on the housing,
- wherein the first magnet is configured to move the lens in the optical axis direction,
- wherein the second magnet is configured to move the image sensor in the direction perpendicular to the optical axis direction,
- wherein the housing comprises first to fourth side surfaces,
- wherein the second magnet comprises a first unit magnet disposed to correspond to the first side surface of the housing, a second unit magnet disposed to correspond to the second side surface of the housing, and a third unit magnet disposed to correspond to the third side surface of the housing,
- wherein the first side surface of the housing and the second side surface of the housing are disposed opposite to each other,
- wherein a part of the first unit magnet of the second magnet is overlapped with the third unit magnet of the second magnet in a y-axis direction perpendicular to the optical axis direction, and
- wherein the first magnet is overlapped with the second magnet in the optical axis direction.

19. The camera device of claim 18, comprising:
- a first coil disposed at a position corresponding to the first magnet; and
- a second coil disposed at a position corresponding to the second magnet,
- wherein the first unit magnet of the second magnet comprises a part protruding to an outside of the second coil in a x-axis direction perpendicular to the optical axis direction and the y-axis direction.

20. The camera device of claim 19, wherein the part of the first unit magnet of the second magnet is not overlapped with the second coil in the optical axis direction.

* * * * *